United States Patent
Luo et al.

(10) Patent No.: US 11,265,820 B2
(45) Date of Patent: *Mar. 1, 2022

(54) METHOD FOR CONTROLLING TRANSMIT POWER OF WIRELESS COMMUNICATIONS TERMINAL, AND WIRELESS COMMUNICATIONS TERMINAL

(71) Applicant: Honor Device Co., Ltd., Shenzhen (CN)

(72) Inventors: Jian Luo, Beijing (CN); Hui Jin, Beijing (CN); Songping Yao, Beijing (CN); Hongyu Li, Beijing (CN); Yingwei Li, Beijing (CN); Hongming Zhang, Shenzhen (CN); Xuyang Du, Beijing (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/781,532

(22) Filed: Feb. 4, 2020

(65) Prior Publication Data
US 2020/0178181 A1 Jun. 4, 2020

Related U.S. Application Data

(63) Continuation of application No. 15/764,747, filed as application No. PCT/CN2015/091017 on Sep. 29, 2015, now Pat. No. 10,820,280.

(51) Int. Cl.
*H04W 52/24* (2009.01)
*H04B 7/06* (2006.01)
(Continued)

(52) U.S. Cl.
CPC .......... *H04W 52/24* (2013.01); *H04B 7/0452* (2013.01); *H04B 7/06* (2013.01);
(Continued)

(58) Field of Classification Search
CPC .. H04B 7/0626; H04B 7/0417; H04B 7/0632; H04B 7/0634; H04B 7/0639;
(Continued)

(56) References Cited

U.S. PATENT DOCUMENTS 8,588,351 B2 * 11/2013 Bush .................... H04B 1/0092
375/347
8,903,018 B2 * 12/2014 Wang .................... H04B 17/102
375/315
(Continued)

FOREIGN PATENT DOCUMENTS

CN 1371221 A 9/2002
CN 101697509 A 4/2010
(Continued)

OTHER PUBLICATIONS

Machine Translation and Abstract of Chinese Publication No. CN104717726, Jun. 17, 2015, 7 pages.
(Continued)

*Primary Examiner* — James M Perez
(74) *Attorney, Agent, or Firm* — Conley Rose, P.C.

(57) ABSTRACT

A method for controlling a transmit power of a terminal, and a terminal, where the method and the terminal include, working states of a first antenna and a second antenna may be monitored, and then a transmit power of the first antenna or that of the second antenna may be controlled according to a preset correspondence. Therefore, according to the method and the terminal, a transmit power of an antenna in a working state in the first antenna and the second antenna may be accurately controlled. If the transmit power is less than a standard transmit power, a Specific Absorption Rate (SAR) can be reduced.

20 Claims, 13 Drawing Sheets

(51) Int. Cl.
*H04B 7/0452* (2017.01)
*H04W 52/26* (2009.01)
*H04W 84/12* (2009.01)

(52) U.S. Cl.
CPC .......... *H04B 7/0623* (2013.01); *H04W 52/26* (2013.01); *H04W 84/12* (2013.01)

(58) Field of Classification Search
CPC .. H04B 7/0413; H04B 7/0456; H04B 7/0408; H04B 7/0486; H04B 7/0619; H04B 7/0628; H04B 47/0682; H04B 7/0452; H04B 7/06; H04B 7/0602–0608; H04B 7/61; H04B 7/0623; H04W 52/24; H04W 52/241–248; H04W 52/26
See application file for complete search history.

(56) References Cited

U.S. PATENT DOCUMENTS

| | | | | |
|---|---|---|---|---|
| 8,948,293 | B2* | 2/2015 | Onggosanusi | H04B 7/024 375/284 |
| 8,977,876 | B2* | 3/2015 | Yang | G06F 1/3234 713/320 |
| 8,989,792 | B1* | 3/2015 | Depew | H01Q 21/28 455/522 |
| 8,995,594 | B2* | 3/2015 | Kesling | H04L 27/06 375/350 |
| 9,042,879 | B2* | 5/2015 | Zhang | H04W 52/04 455/419 |
| 9,154,230 | B2* | 10/2015 | Jia | H04B 10/801 |
| 9,191,101 | B2* | 11/2015 | Wang | H04J 14/0291 |
| 9,325,369 | B2* | 4/2016 | Lee | H04B 1/715 |
| 9,485,713 | B2* | 11/2016 | Zhao | H04W 48/06 |
| 9,490,885 | B1* | 11/2016 | Zheng | H04W 52/42 |
| 9,877,353 | B2* | 1/2018 | Lee | H04W 76/34 |
| 10,020,840 | B2* | 7/2018 | Lee | H04B 1/715 |
| 10,200,952 | B2* | 2/2019 | Lin | H04W 52/0235 |
| 10,420,023 | B2* | 9/2019 | Ramasamy | H04B 17/102 |
| 10,820,280 | B2* | 10/2020 | Luo | H04B 7/06 |
| 10,932,194 | B2* | 2/2021 | Wang | H04B 17/318 |
| 11,115,073 | B2* | 9/2021 | Hou | H04W 52/367 |
| 2001/0041551 | A1* | 11/2001 | Rotzoll | H04W 52/0229 455/343.2 |
| 2002/0115474 | A1* | 8/2002 | Yoshino | H04W 16/28 455/562.1 |
| 2003/0119568 | A1* | 6/2003 | Menard | H04W 52/0229 455/572 |
| 2003/0165191 | A1* | 9/2003 | Kokuryo | H04L 25/03133 375/231 |
| 2004/0032825 | A1* | 2/2004 | Halford | H04L 27/0008 370/208 |
| 2004/0218699 | A1* | 11/2004 | Carsello | H04L 7/042 375/343 |
| 2007/0238483 | A1* | 10/2007 | Boireau | H04B 1/525 455/553.1 |
| 2010/0119005 | A1* | 5/2010 | Agrawal | H04W 52/34 375/267 |
| 2010/0279621 | A1* | 11/2010 | Brown | H04L 1/0026 455/67.11 |
| 2011/0133852 | A1* | 6/2011 | Bauder | H01Q 9/14 333/132 |
| 2011/0243007 | A1* | 10/2011 | Xiao | H04W 52/52 370/252 |
| 2011/0254637 | A1* | 10/2011 | Manssen | H03H 7/40 333/2 |
| 2011/0255570 | A1* | 10/2011 | Fujiwara | H04B 1/7143 375/133 |
| 2012/0021707 | A1* | 1/2012 | Forrester | H04W 52/30 455/103 |
| 2013/0202288 | A1* | 8/2013 | Jia | H04B 10/801 398/15 |
| 2013/0205155 | A1* | 8/2013 | Yang | H04L 12/12 713/323 |
| 2013/0308554 | A1* | 11/2013 | Ngai | H04B 7/0604 370/329 |
| 2013/0309981 | A1* | 11/2013 | Ngai | H04B 7/0602 455/78 |
| 2013/0331046 | A1* | 12/2013 | Hawaka | H04W 52/18 455/127.1 |
| 2014/0051470 | A1* | 2/2014 | Patil | H04W 72/048 455/509 |
| 2014/0057623 | A1* | 2/2014 | Zhang | H04W 28/0289 455/419 |
| 2014/0112654 | A1* | 4/2014 | Wang | H04J 14/0291 398/5 |
| 2014/0119312 | A1* | 5/2014 | Doetsch | H04B 7/0404 370/329 |
| 2014/0133333 | A1* | 5/2014 | Liu | H04W 24/10 370/252 |
| 2014/0342784 | A1* | 11/2014 | Pan | H04W 52/247 455/572 |
| 2014/0370830 | A1* | 12/2014 | Steer | H04W 52/18 455/127.1 |
| 2015/0208345 | A1* | 7/2015 | Weissman | H04W 52/0209 455/574 |
| 2016/0112970 | A1* | 4/2016 | Chen | H04B 7/0617 455/522 |
| 2017/0034767 | A1* | 2/2017 | Griot | H04W 74/0833 |
| 2017/0188294 | A1* | 6/2017 | Xu | H04W 48/16 |
| 2018/0288710 | A1* | 10/2018 | Luo | H04W 52/24 |
| 2019/0028970 | A1* | 1/2019 | Wang | H04B 17/318 |
| 2019/0140706 | A1* | 5/2019 | Chang | H04B 7/0413 |
| 2019/0215765 | A1* | 7/2019 | Ramasamy | H04B 1/406 |
| 2020/0015161 | A1* | 1/2020 | Ramasamy | H04B 1/3838 |
| 2020/0178181 | A1* | 6/2020 | Luo | H04B 7/0452 |

FOREIGN PATENT DOCUMENTS

| | | |
|---|---|---|
| CN | 102131274 A | 7/2011 |
| CN | 103249133 A | 8/2013 |
| CN | 104541563 A | 4/2015 |
| CN | 104661290 A | 5/2015 |
| CN | 104717726 A | 6/2015 |
| CN | 102595571 B | 7/2015 |
| CN | 104812102 A | 7/2015 |
| JP | 2013537755 A | 10/2013 |
| JP | 2013255156 A | 12/2013 |
| JP | 2015521006 A | 7/2015 |
| KR | 20150022833 A | 3/2015 |
| RU | 2533186 C2 | 11/2014 |
| WO | 2010069357 A1 | 6/2010 |
| WO | 2013176786 A1 | 11/2013 |
| WO | 2014163750 A1 | 10/2014 |
| WO | 2014200958 A2 | 12/2014 |

OTHER PUBLICATIONS

Machine Translation and Abstract of Chinese Publication No. CN104812102, Jul. 29, 2015, 7 pages.
Machine Translation and Abstract of Korean Publication No. KR20150022833, Mar. 4, 2015, 54 pages.
Machine Translation and Abstract of Chinese Publication No. CN102131274, Jul. 20, 2011, 15 pages.
Machine Translation and Abstract of Chinese Publication No. CN1103249133, Aug. 14, 2013, 13 pages.
Machine Translation and Abstract of Chinese Publication No. CN1104661290, May 27, 2015, 19 pages.
Foreign Communication From a Counterpart Application, PCT Application No. PCT/CN2015/091017, English Translation of International Search Report dated Jul. 1, 2016, 2 pages.
Foreign Communication From a Counterpart Application, PCT Application No. PCT/CN2015/091017, English Translation of Written Opinion dated Jul. 1, 2016, 7 pages.
Foreign Communication From a Counterpart Application, European Application No. 15905029.3, Extended European Search Report dated Aug. 9, 2018, 9 pages.
Foreign Communication From a Counterpart Application, Russian Application No. 2018115742, Russian Office Action dated Sep. 20, 2018, 7 pages.

(56) References Cited

OTHER PUBLICATIONS

Foreign Communication From a Counterpart Application, Russian Application No. 2018115742, English Translation of Russian Office Action dated Sep. 24, 2018, 3 pages.
Foreign Communication From a Counterpart Application, Japanese Application No. 2018-535212, Japanese Office Action dated Mar. 12, 2019, 6 pages.
Foreign Communication From a Counterpart Application, Japanese Application No. 2018-535212, English Translation of Japanese Office Action dated Mar. 12, 2019, 6 pages.
Foreign Communication From a Counterpart Application, Japanese Application No. 10-2018-7011943, Japanese Office Action dated Jul. 30, 2019, 6 pages.
Foreign Communication From a Counterpart Application, Japanese Application No. 10-2018-7011943, English Translation of Japanese Office Action dated Jul. 30, 2019, 4 pages.
Foreign Communication From a Counterpart Application, Chinese Application No. 201580039647.8, Chinese Office Action dated Jan. 3, 2020, 10 pages.

\* cited by examiner

METHOD FOR CONTROLLING TRANSMIT POWER OF WIRELESS COMMUNICATIONS TERMINAL, AND WIRELESS COMMUNICATIONS TERMINAL

CROSS REFERENCE TO RELATED APPLICATION

This application is a continuation of U.S. patent application Ser. No. 15/764,747 filed on Mar. 29, 2018, which is a National Stage of International Patent Application No. PCT/CN2015/091017 filed on Sep. 29, 2015. Both of the aforementioned applications are hereby incorporated by reference in their entireties.

TECHNICAL FIELD

Embodiments of the present disclosure relate to the communications field, and in particular, to a method for controlling a transmit power of a wireless communications terminal, and a wireless communications terminal.

BACKGROUND

With development of information technologies, a user becomes increasingly aware of the effect of electromagnetic radiation of a wireless communications terminal on people's health while enjoying various convenience brought by the wireless communications terminal. In this field, electromagnetic radiation is usually measured using a counter Specific Absorption Rate (SAR). Therefore, reduction of electromagnetic radiation may be implemented by reducing the SAR.

Generally, a person skilled in the art reduces electromagnetic radiation of a wireless communications terminal by reducing a transmit power of an antenna. However, reducing the transmit power of the antenna may degrade communication quality. Therefore, a balance between reducing a transmit power and ensuring communication quality needs to be considered.

Using a mobile phone as an example, the existing mobile phone has strong functions, and includes multiple antennas such as an upper antenna and a lower antenna. Therefore, in a multi-antenna scenario, how to accurately control a transmit power of an antenna to reduce electromagnetic radiation of the mobile phone without affecting communication quality becomes an urgent problem to be resolved.

SUMMARY

Embodiments of the present disclosure provide a method for controlling a transmit power of a wireless communications terminal, and a wireless communications terminal, to control a transmit power of a multi-antenna wireless communications terminal, and further reduce electromagnetic radiation of a mobile phone without affecting communication quality.

According to a first aspect, an embodiment of the present disclosure provides a method for controlling a transmit power of a wireless communications terminal, where the wireless communications terminal includes a first controller, a second controller, a first antenna, and a second antenna, and the method includes determining, by the first controller, that the first antenna is in a working state, obtaining, by the first controller, a transmit power of the first antenna according to a preset correspondence, and sending the transmit power of the first antenna to the second controller, where the transmit power of the first antenna obtained by the first controller is used to control, after the second controller receives the transmit power of the first antenna, the first antenna to perform transmission according to the transmit power. In this way, the wireless communications terminal first determines that the first antenna in the first antenna and the second antenna is in a working state, and then controls the transmit power of the first antenna. Therefore, a using status of an antenna can be accurately identified, and this helps accurately control electromagnetic radiation. Although electromagnetic radiation can be reduced by reducing a transmit power, an excessively low transmit power affects communication quality. Therefore, a transmit power cannot be set randomly, and an appropriate value needs to be determined in advance. In this embodiment of the present disclosure, it is proposed that the transmit power of the first antenna is determined according to the preset correspondence, and the correspondence includes an appropriate transmit power value specific to an antenna scenario. In conclusion, in this embodiment of the present disclosure, electromagnetic radiation can be accurately controlled without affecting communication quality.

Optionally, the method further includes determining, by the first controller, that the second antenna is switched to a working state, and obtaining, by the first controller, a transmit power of the second antenna according to a preset correspondence, and sending the transmit power of the second antenna to the second controller, where the transmit power of the second antenna obtained by the first controller is used to control, after the second controller receives the transmit power of the second antenna, the second antenna to perform transmission according to the transmit power. In this way, after switching from the first antenna to the second antenna is performed, the wireless communications terminal controls transmission of the second antenna according to a preset transmit power. Therefore, electromagnetic radiation can be accurately controlled without affecting communication quality.

According to a second aspect, an embodiment of the present disclosure provides a method for controlling a transmit power of a wireless communications terminal, where the wireless communications terminal includes a first controller, a WI-FI controller, and a WI-FI antenna, and the method includes determining, by the first controller, that the WI-FI antenna is in a working state, and determining a service type of the WI-FI antenna, and obtaining, by the first controller, a transmit power of the WI-FI antenna according to a preset correspondence, and sending the transmit power of the WI-FI antenna to the WI-FI controller, where the transmit power of the WI-FI antenna obtained by the first controller is used to control, after the WI-FI controller receives the transmit power of the WI-FI antenna, the WI-FI antenna to perform transmission according to the transmit power. In this way, the WI-FI service type is determined, and the transmit power of the WI-FI antenna is controlled according to the preset correspondence. Therefore, electromagnetic radiation can be accurately controlled without affecting communication quality.

According to a third aspect, an embodiment of the present disclosure provides a method for controlling a transmit power of a wireless communications terminal, where the wireless communications terminal includes a first controller, a second controller, a WI-FI controller, a first antenna, a second antenna, and a WI-FI antenna, and the method includes determining, by the first controller, that the first antenna is in a working state, determining, by the first controller, that the wireless communications terminal is set as a WI-FI access hotspot, obtaining, by the first controller, a transmit power of the first antenna and that of the WI-FI antenna according to preset correspondences, and sending the transmit powers to the second controller and the WI-FI controller respectively, where the transmit power of the first antenna and that of the WI-FI antenna obtained by the first controller are used to respectively control, after the second controller and the WI-FI controller receive the transmit powers, the first antenna and the WI-FI antenna to perform transmission according to the transmit powers. According to this embodiment of the present disclosure, it may be determined that both the first antenna and the WI-FI antenna are in working states, and the transmit power of the first antenna and that of the WI-FI antenna are controlled according to the preset correspondences. Therefore, electromagnetic radiation can be accurately controlled without affecting communication quality.

Optionally, the method further includes determining, by the first controller, that the second antenna is switched to a working state, and obtaining, by the first controller, a transmit power of the second antenna and that of the WI-FI antenna according to preset correspondences, and sending the transmit powers to the second controller and the WI-FI controller respectively, where the transmit power of the second antenna and that of the WI-FI antenna obtained by the first controller are used to respectively control, after the second controller and the WI-FI controller receive the transmit powers, the second antenna and the WI-FI antenna to perform transmission according to the transmit powers. After switching from the first antenna to the second antenna is performed, the wireless communications terminal determines that both the second antenna and the WI-FI antenna are in working states, and the transmit power of the second antenna and that of the WI-FI antenna are controlled according to the preset correspondences. Therefore, electromagnetic radiation can be accurately controlled without affecting communication quality.

According to a fourth aspect, an embodiment of the present disclosure provides a method for controlling a transmit power of a wireless communications terminal, where the wireless communications terminal includes a controller, a first antenna, and a second antenna, and the method includes determining, by the controller, that the first antenna is in a working state, obtaining, by the controller, a transmit power of the first antenna according to a preset correspondence, and controlling, by the controller, the first antenna to perform transmission according to the transmit power. In this way, the wireless communications terminal first determines that the first antenna in the first antenna and the second antenna is in a working state, and then controls the transmit power of the first antenna. Therefore, a using status of an antenna can be accurately identified, and this helps accurately control electromagnetic radiation. Although electromagnetic radiation can be reduced by reducing a transmit power, an excessively low transmit power affects communication quality. Therefore, a transmit power cannot be set randomly, and an appropriate value needs to be determined in advance. In this embodiment of the present disclosure, it is proposed that the transmit power of the first antenna is determined according to the preset correspondence, and the correspondence includes an appropriate transmit power value specific to an antenna scenario. In conclusion, in this embodiment of the present disclosure, electromagnetic radiation can be accurately controlled without affecting communication quality.

Optionally, the method further includes determining, by the controller, that the second antenna is switched to a working state, obtaining, by the controller, a transmit power of the second antenna according to a preset correspondence, and controlling, by the controller, the second antenna to perform transmission according to the transmit power. In this way, after switching from the first antenna to the second antenna is performed, the wireless communications terminal controls transmission of the second antenna according to a preset transmit power. Therefore, electromagnetic radiation can be accurately controlled without affecting communication quality.

According to a fifth aspect, an embodiment of the present disclosure provides a method for controlling a transmit power of a wireless communications terminal, where the wireless communications terminal includes a controller, a WI-FI controller, and a WI-FI antenna, and the method includes determining, by the controller, that the WI-FI antenna is in a working state, and determining a service type of the WI-FI antenna, and obtaining, by the controller, a transmit power of the WI-FI antenna according to a preset correspondence, and sending the transmit power of the WI-FI antenna to the WI-FI controller, where the transmit power of the WI-FI antenna obtained by the controller is used to control, after the WI-FI controller receives the transmit power of the WI-FI antenna, the WI-FI antenna to perform transmission according to the transmit power. In this way, the WI-FI service type is determined, and the transmit power of the WI-FI antenna is controlled according to the preset correspondence. Therefore, electromagnetic radiation can be accurately controlled without affecting communication quality.

According to a sixth aspect, an embodiment of the present disclosure provides a method for controlling a transmit power of a wireless communications terminal, where the wireless communications terminal includes a controller, a WI-FI controller, a first antenna, a second antenna, and a WI-FI antenna, and the method includes determining, by the controller, that the first antenna is in a working state, determining, by the controller, that the wireless communications terminal is set as a WI-FI access hotspot, obtaining, by the controller, a transmit power of the first antenna and that of the WI-FI antenna according to preset correspondences, sending, by the controller, the transmit power of the WI-FI antenna to the WI-FI controller, where the transmit power of the WI-FI antenna is used to control, after the WI-FI controller receives the transmit power of the WI-FI antenna, the WI-FI antenna to perform transmission according to the transmit power of the WI-FI antenna, and controlling, by the controller, the first antenna to perform transmission according to the transmit power of the first antenna. According to this embodiment of the present disclosure, it may be determined that both the first antenna and the WI-FI antenna are in working states, and the transmit power of the first antenna and that of the WI-FI antenna are controlled according to the preset correspondences. Therefore, electromagnetic radiation can be accurately controlled without affecting communication quality.

Optionally, the method further includes determining, by the controller, that the second antenna is switched to a working state, obtaining, by the controller, a transmit power of the second antenna and that of the WI-FI antenna according to preset correspondences, sending, by the controller, the transmit power of the WI-FI antenna to the WI-FI controller, where the transmit power of the WI-FI antenna is used to control, after the WI-FI controller receives the transmit power of the WI-FI antenna, the WI-FI antenna to perform transmission according to the transmit power of the WI-FI antenna, and controlling, by the controller, the second antenna to perform transmission according to the transmit power of the second antenna. After switching from the first antenna to the second antenna is performed, the wireless communications terminal determines that both the second antenna and the WI-FI antenna are in working states, and the transmit power of the second antenna and that of the WI-FI antenna are controlled according to the preset correspondences. Therefore, electromagnetic radiation can be accurately controlled without affecting communication quality.

Further, in the foregoing methods, whether an optical proximity sensor is triggered may be used in combination to determine whether a user is close to a wireless communications terminal, for example, whether the user holds a mobile phone close to the head to perform voice communication, and then a transmit power of an antenna is controlled according to a preset relationship. Therefore, electromagnetic radiation can be more accurately controlled without affecting communication quality.

Further, the present disclosure further provides an apparatus for controlling a wireless communications terminal, and a wireless communications terminal corresponding to the foregoing methods.

In conclusion, according to the method and the wireless communications terminal in the embodiments of the present disclosure, electromagnetic radiation can be accurately controlled without affecting communication quality.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The described embodiments are merely some but not all of the embodiments of the present disclosure. All other embodiments obtained by a person of ordinary skill in the art based on the embodiments of the present disclosure shall fall within the protection scope of the present disclosure.

A wireless communications terminal in the embodiments of the present disclosure may include a mobile phone, a tablet computer, or the like.

Figure 1:
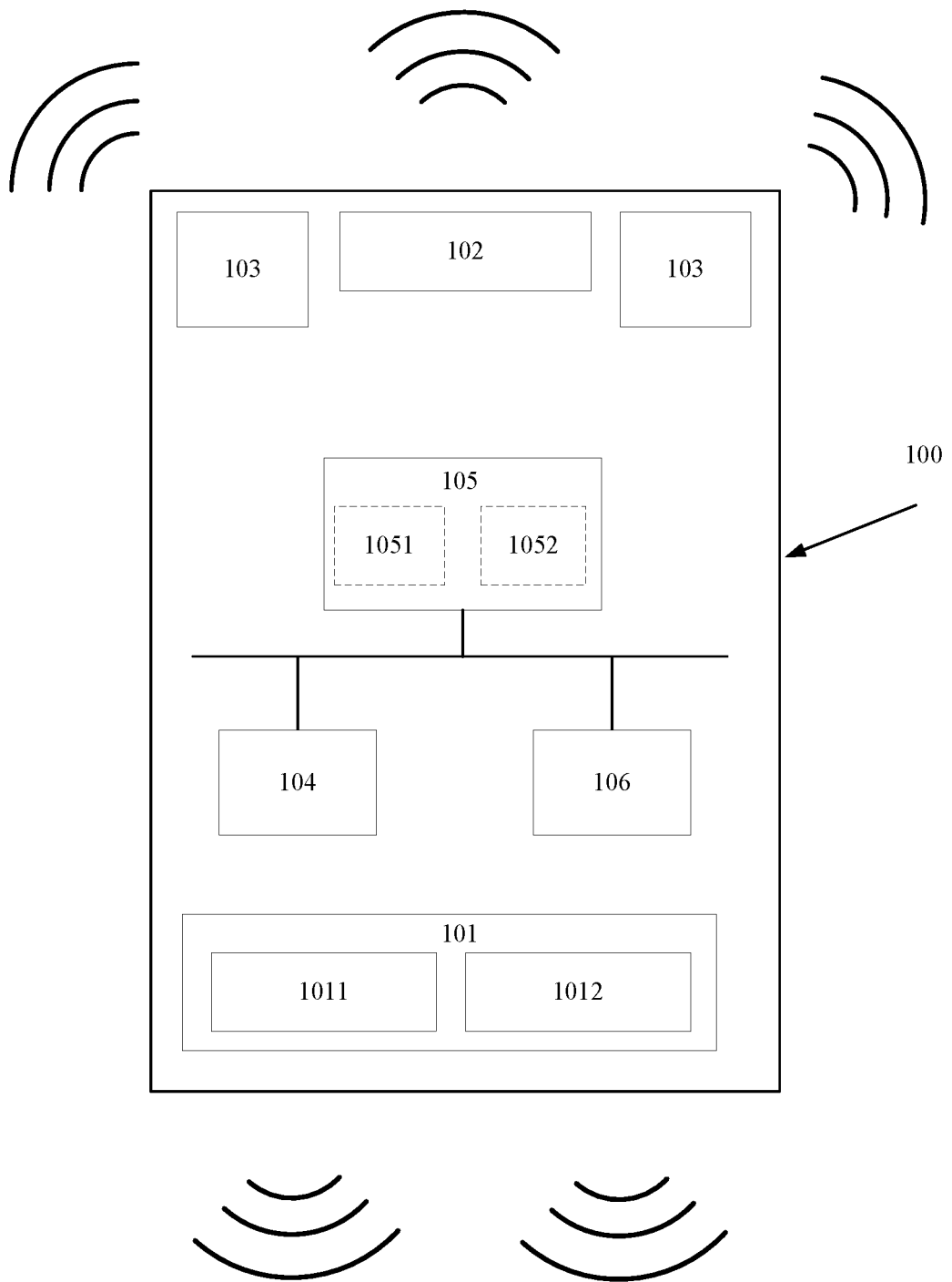
FIG. 1 is a schematic structural diagram of a wireless communications terminal according to an embodiment of the present disclosure.

FIG. 1 shows a schematic diagram of a part of a structure of a wireless communications terminal 100 related to an embodiment of the present disclosure. A mobile phone is used for description in the embodiments of the present disclosure, and does not constitute a limitation thereon though.

Referring to FIG. 1, the wireless communications terminal 100 may include antennas 101, 102 and 103, an optical proximity sensor 104, a controller 105, and a memory 106.

The antenna 101 is usually referred to as a lower antenna or a primary antenna. Correspondingly, the antenna 102 is usually referred to as an upper antenna or a secondary antenna. The antenna 103 is a WI-FI antenna. Referring to FIG. 1, the lower antenna 101 may be further divided into a voice antenna 1011 and a data antenna 1012. It is easy to understand that at least voice communication and data communication are included when the mobile phone performs communication. Therefore, the lower antenna 101 may be further divided into the voice antenna 1011 and the data antenna 1012 corresponding to voice communication and data transmission respectively. The upper antenna 102 may also be further divided into a voice antenna and a data antenna. Considering a structure layout of the WI-FI antenna 103, the upper antenna 102 may not be further divided (no further division is provided in FIG. 1). The WI-FI antenna 103 may be disposed on either side of the upper antenna 102. It is easy to understand that the mobile phone may, using WI-FI, perform data transmission, serve as an access hotspot, perform voice communication, and the like. A person skilled in the art may understand that the layout of the antennas is merely an example, and does not constitute a limitation thereon.

The optical proximity sensor 104 generally uses a principle of infrared distance measurement to determine a distance from an obstacle to the sensor. On the mobile phone, the optical proximity sensor 104 is usually used to determine a distance from the mobile phone to the head.

The controller 105 is a control center of the wireless communications terminal 100. The controller 105 connects parts of the entire wireless communications terminal 100 using various interfaces and lines. The controller 105 may execute various functions of the wireless communications terminal 100 by running or executing a software program and/or a module stored in the memory 106 and by invoking data stored in the memory 106 to perform overall monitoring on the wireless communications terminal. In an example, the controller 105 may be a microprocessor. Referring to FIG. 1, the controller 105 may be further divided into two controllers, for example, an application processor 1051 (e.g. AP) and a communication processor 1052 (e.g. Modem).

The memory 106 may be configured to store the software program and related data. The controller 105 runs the software program and the data stored in the memory 106 to execute various functional applications of the wireless communications terminal 100 and process data. The memory 106 may mainly include a program storage area and a data storage area. In addition, the memory 106 may include a high-speed random access memory (RAM), and may further include a non-volatile memory, for example, at least one magnetic disk storage device, a flash memory component, or another volatile solid-state storage device.

A person skilled in the art may understand that the wireless communications terminal 100 structure shown in FIG. 1 does not constitute a limitation on the wireless communications terminal. A person of ordinary skill in the art may make appropriate modifications to the structure in FIG. 1 according to requirements, for example, removing some components, adding some components, or replacing some components in FIG. 1 with other components.

Figure 2:
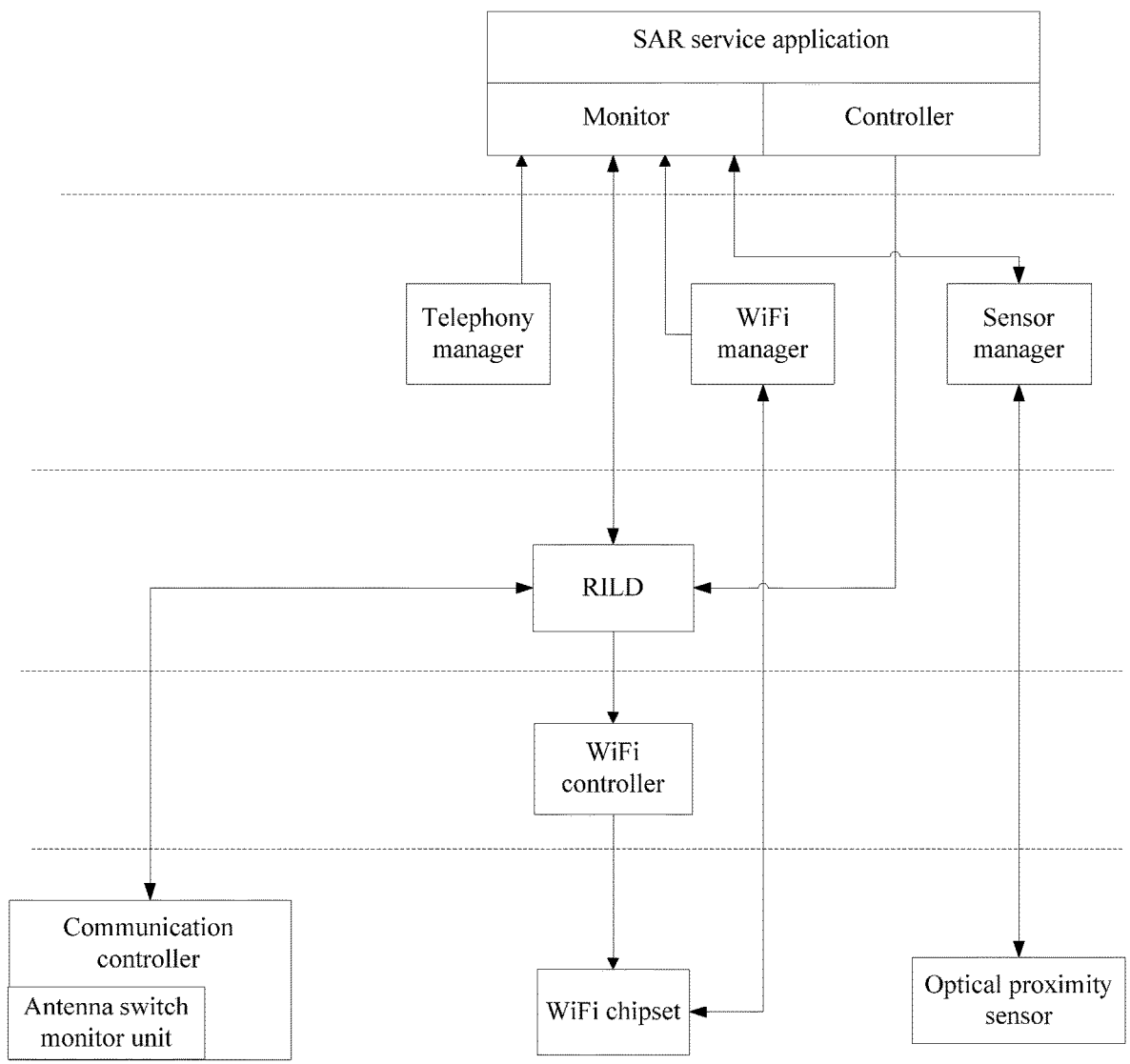
FIG. 2 is a schematic diagram of an internal architecture of a wireless communications terminal according to an embodiment of the present disclosure.

A mobile phone is used as an example. FIG. 2 is an internal architecture of the mobile phone running on the Android operating system according to an embodiment of the present disclosure.

Referring to FIG. 2, the mobile phone includes a communication controller (modem), a WI-FI chipset (WI-FI chipset), and an optical proximity sensor (proximity sensor).

The communication controller (modem) may be configured to control a transmit power of an upper antenna or a lower antenna. In this embodiment of the present disclosure, code or a module may be added to the communication controller (modem), to form an antenna switch monitor unit (antenna switch monitor). The antenna switch monitor unit may be configured to learn that either the upper antenna or the lower antenna is in a working state, including a voice communication type and whether data transmission is performed.

The WI-FI chipset is configured to establish a WI-FI network, including performing data transmission with another terminal, or serving as an access hotspot, or performing WI-FI voice communication.

The optical proximity sensor (proximity sensor) may be configured to determine, using a principle of infrared reflection, whether the mobile phone is close to the head.

The mobile phone further includes a telephony manager, a WI-FI manager, a sensor manager, and a Radio Interface Layer Deamon (RILD).

The telephony manager provides a series of obtaining methods for accessing a status and information related to mobile phone communication, including a status and information about a subscriber identity module (SIM) of the mobile phone, and a telecommunications network status and user information of the mobile phone.

The WI-FI manager provides most application programming interfaces (APIs) for managing WI-FI connections, and is configured to manage, create, or disable a WI-FI network connection, and query dynamic information about the WI-FI network.

The sensor manager is configured to manage a sensor, and may obtain a type of the sensor, a value of the sensor, and the like.

The RILD is connected to the communication controller (modem) downwards, and is connected to a JAVA library related to an upper-layer application upwards. In this embodiment of the present disclosure, the RILD may learn, from the communication controller, that the upper antenna or the lower antenna is in a working state, including a voice communication type and whether data transmission is performed, and may further obtain a transmit power of an antenna from a controller of a SAR service application described in the following.

The SAR service application may be a functional module running in the application processor (AP). Further, the SAR service application may include a monitor and a controller.

The monitor may register with the telephony manager, and learn that the upper antenna or the lower antenna is in a working state, including a voice communication type and whether data transmission is performed. Alternatively, the monitor may register with the RILD, and learn, from the communication controller using the RILD, that the upper antenna or the lower antenna is in a working state, including a voice communication type and whether data transmission is performed. Alternatively, the monitor may learn of a working state of the WI-FI chipset using the WI-FI manager, including whether the WI-FI chipset establishes a WI-FI network, performs data transmission with another terminal, serves as an access hotspot, or performs WI-FI voice communication.

The controller is configured to obtain a transmit power of an antenna according to a working state of the antenna. The mobile phone pre-stores a correspondence between a working state of an antenna and a transmit power of the antenna, for example, a truth table. In this way, after obtaining the working state of the antenna from the monitor, the controller may determine the transmit power of the antenna according to the truth table. For details, refer to the following embodiments. After determining the transmit power of the antenna, the controller may instruct, using the RILD, the communication controller to control the transmit power of the corresponding antenna.

In addition, the mobile phone further includes a WI-FI controller configured to receive a transmit power of the WI-FI antenna from the RILD, and control the WI-FI chipset to perform transmission according to the received transmit power.

In addition, the monitor further learns, from the sensor manager (SensorManager), whether the optical proximity sensor is triggered. Correspondingly, the controller further determines, based on a working state of an antenna and whether the optical proximity sensor is triggered, a transmit power of the antenna.

It should be noted that, although the AP is not shown in FIG. 2, the SAR service application, the telephony manager, the WI-FI manager, the sensor manager, the RILD, and the WI-FI controller that are described above all run in the AP.

In addition, compared with the existing Android architecture, in this embodiment of the present disclosure, the SAR service application is added. Moreover, the communication controller includes the antenna switch monitor unit (antenna switch monitor). These are closely related to control of a transmit power of an antenna to be described in the following.

A person skilled in the art may understand that the wireless communications terminal in this embodiment of the present disclosure may perform at least steps or functions in any one of the following embodiments.

Embodiment 1

Figure 3:
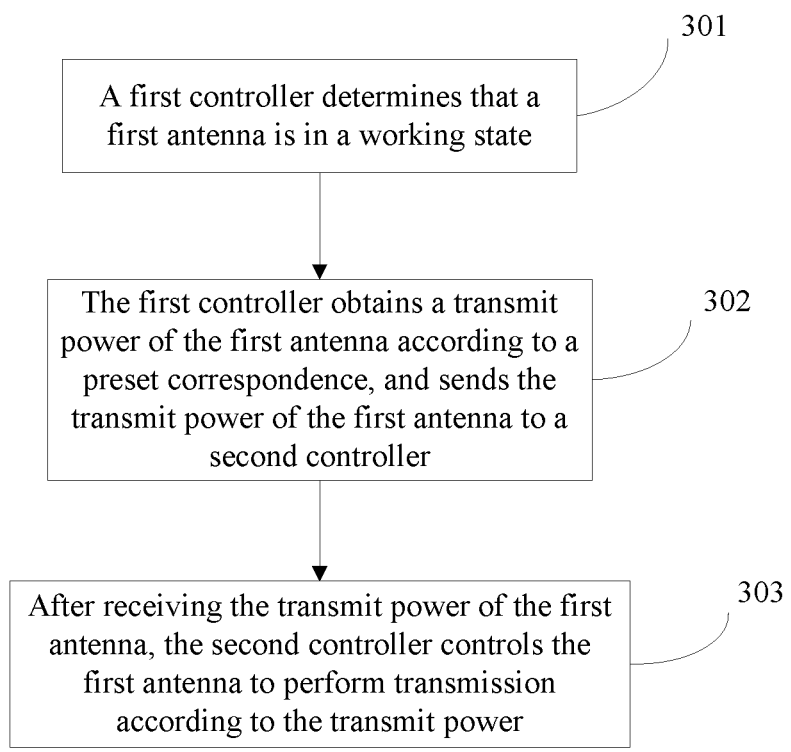
FIG. 3 is a flowchart of a method for controlling a transmit power of a wireless communications terminal according to Embodiment 1.

FIG. 3 is a flowchart of a method for controlling a transmit power implemented by a wireless communications terminal according to an embodiment of the present disclosure. A person skilled in the art may understand that, although the methods described in this embodiment and the following embodiments of the present disclosure include multiple operations in a specific sequence, these methods may include more or fewer operations, these operations may be performed sequentially or performed concurrently, and there is no strict order between these sequences.

In this embodiment of the present disclosure, an example in which a first controller is an AP, a second controller is a communication controller is used for description. This does not constitute a limitation thereon.

Step 301. The first controller determines that the first antenna is in a working state.

A mobile phone includes a lower antenna 101 and an upper antenna 102, and the AP needs to determine whether the lower antenna 101 or the upper antenna 102 is in a working state. As described above, an obtaining manner may include an RILD learns, from the communication controller, that the lower antenna 101 or the upper antenna 102 is in a working state. Further, an antenna switch monitor unit of the communication controller may learn, by means of monitoring, whether the lower antenna 101 or the upper antenna 102 is in a working state. After the RILD learns, for example, that the lower antenna 101 is in a working state, the RILD sends the information that the lower antenna 101 is in a working state to a monitor of a SAR service application.

Certainly, it may be that the monitor registers with a telephony manager to learn, for example, that the lower antenna 101 is in a working state. No limitation is set herein.

Further, the first controller may determine whether the lower antenna 101 in a working state is in voice communication or data transmission, and if the lower antenna 101 in a working state is in voice communication, determine whether the lower antenna 101 performs second generation (2G)/third generation (3G) voice communication or fourth generation (4G) voice communication including Voice over Long term evaluation (VOLTE). All the information may be obtained using the communication controller or the telephony manager. Herein, the examples 2G/3G voice communication and 4G voice communication including VOLTE are used merely to describe a difference between the two voice communication types, and the latter voice communication type is more advanced than the former voice communication type. However, this does not constitute a limitation thereon, and so do the following similar cases.

Step 302. The first controller obtains a transmit power of the first antenna according to a preset correspondence, and sends the transmit power of the first antenna to the second controller.

A correspondence between a working state of an antenna and a transmit power of the antenna is preset in a mobile phone, for example, a truth table. The following shows a preset truth table. It may be understood that the correspondence may be in another form, and details are not provided herein.

Table 1 is a part of the truth table. The first column is a state sequence number, the second column is an antenna working state, and the third column is a transmit power of a corresponding antenna. It is easy to understand that, values in the truth table are used only for examples, and do not constitute a limitation thereon, so do the following embodiments.

TABLE 1

| State | | Transmit Power in decibel-milliwatts (dBm) | | |
|---|---|---|---|---|
| Sequence Number | Working State | Lower Antenna | Upper Antenna | WI-FI Antenna |
| 1 | Lower antenna in Global System for Mobile Communications (GSM) voice | 31.5 | NA | NA |
| 2 | Lower antenna in Wideband Code Division Multiple Access (WCDMA) voice | 22.5 | NA | NA |
| 3 | Lower antenna in Code Division Multiple Access (CDMA) voice | 22.5 | NA | NA |
| 4 | Lower antenna in Long Term Evolution (LTE) Frequency Division Duplexing (FDD) & Time Division Duplexing (TDD) voice | 20 | NA | NA |
| 5 | Upper antenna in GSM voice | NA | 30.5 | NA |
| 6 | Upper antenna in WCDMA voice | NA | 22 | NA |
| 7 | Upper antenna in CDMA voice | NA | 22 | NA |
| 8 | Upper antenna in LTE FDD&TDD voice | NA | 19 | NA |

It can be learnt from Table 1 that, in this embodiment of the present disclosure, GSM, WCDMA, and CDMA are used as examples for 2G/3G voice communication, and LTE FDD and LTE TDD are used as examples for 4G voice communication.

Table 1 further lists the correspondence between a working state of an antenna and a transmit power of the antenna. The controller may determine a transmit power of a corresponding antenna according to the truth table. For example, the lower antenna 101 is in a working state of WCDMA voice communication, and the controller may determine that a transmit power of the lower antenna 101 is 22.5 dBm.

It should be noted that the transmit power is an appropriate value determined after a requirement of reducing a SAR to meet an electromagnetic radiation standard without affecting communication quality is taken into consideration. That is, the foregoing transmit powers all are less than a standard transmit power. The standard transmit power is a transmit power of an antenna obtained without considering electromagnetic radiation. It is easy to understand that, if it is considered to reduce the SAR, the transmit powers in Table 1 are less than the standard transmit power. Preferably, the preset transmit powers may be determined in an inverse manner according to requirements on electromagnetic radiation in countries and in combination with communication quality.

Finally, the obtained transmit power of the antenna is sent to the communication controller. Generally, the RILD sends the transmit power determined by the controller to the communication controller.

Step 303. After receiving the transmit power of the first antenna, the second controller controls the first antenna to perform transmission according to the transmit power.

After receiving the transmit power of the lower antenna 101 sent by the RILD, for example, 22.5 dBm, the communication controller can control the lower antenna 101 to perform transmission at 22.5 dBm.

In this way, it can be learnt from the foregoing descriptions that, a wireless communications terminal first determines that the first antenna in the first antenna and the second antenna is in a working state, and then controls a transmit power of the first antenna. Therefore, a using status of an antenna can be accurately identified, and this helps accurately control electromagnetic radiation. In addition, the transmit power of the first antenna is determined according to a preset correspondence. The correspondence includes an appropriate transmit power value specific to an antenna status. In conclusion, in this embodiment of the present disclosure, electromagnetic radiation can be accurately controlled without affecting communication quality.

Further, in the present disclosure, for the antenna in a working state, it may be further determined whether the antenna is in voice communication or data transmission. If the antenna is in voice communication, a voice communication type may be further determined such that the transmit power of the antenna is more accurately controlled. In this way, electromagnetic radiation is controlled without affecting communication quality.

Preferably, when an external environment changes, a working state of the upper antenna or the lower antenna is switched. For example, after a hand of a user blocks the lower antenna 101 in a working state, the mobile phone switches the upper antenna 102 to a working state. After the upper antenna 102 is switched to a working state, the antenna switch monitor unit of the communication controller may learn, by means of monitoring, that the upper antenna 102 is switched to a working state, then learn that the upper antenna 102 performs voice communication using WCDMA, and further notify the RILD. After receiving the information that the upper antenna 102 performs voice communication using WCDMA, the RILD sends the information to the monitor. Alternatively, the telephony manager learns, by means of monitoring, that the upper antenna 102 performs voice communication using WCDMA, and then may notify the monitor. After the monitor sends, to the controller, a working state in which the upper antenna 102 performs voice communication using WCDMA, the controller may obtain, according to the preset truth table, that the transmit power of the antenna is 22 dBm. After the RILD obtains the transmit power of the upper antenna 102, the RILD may instruct the communication controller to control the upper antenna 102 to perform transmission at 22 dBm.

Figure 4:
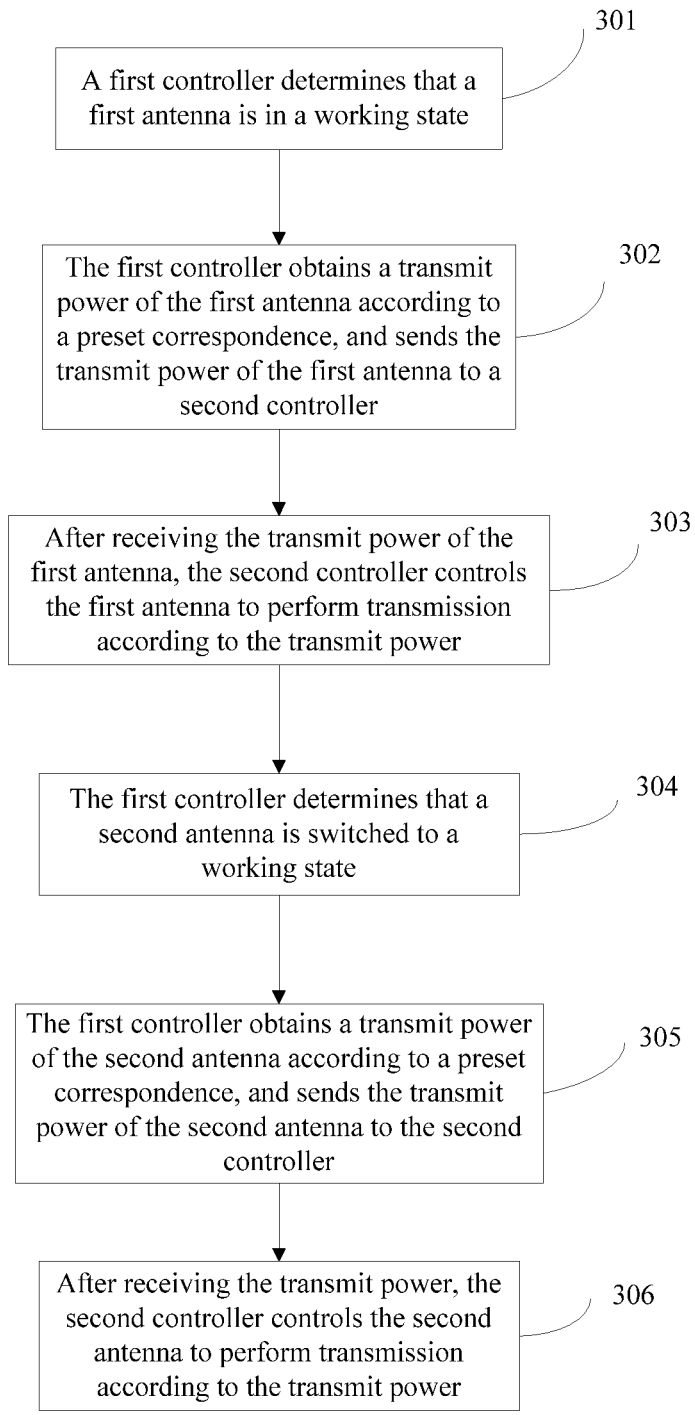
FIG. 4 is another flowchart of a method for controlling a transmit power of a wireless communications terminal according to Embodiment 1.

That is, it can be learnt from FIG. 4 that, based on the method in FIG. 3, the method for controlling a transmit power of Embodiment 1 further includes the following steps.

Step 304. The first controller determines that the second antenna is switched to a working state.

Step 305. The first controller obtains a transmit power of the second antenna according to a preset correspondence, and sends the transmit power of the second antenna to the second controller.

Step 306. After receiving the transmit power of the second antenna, the second controller controls the second antenna to perform transmission according to the transmit power.

For descriptions of steps 304 to 306, refer to steps 301 to 303. Details are not repeated herein. In this way, after switching from the first antenna to the second antenna is performed, the wireless communications terminal controls the transmit power of the second antenna. Therefore, electromagnetic radiation can be accurately controlled without affecting communication quality.

Preferably, after switching from the first antenna to the second antenna is performed, before the communication controller controls transmission of the second antenna according to a preset transmit power of the second antenna, the communication controller may first set the transmit power of the second antenna to a standard transmit power, and then control transmission of the second antenna according to the preset transmit power. In this way, when transmit power switching is performed, better control can be logically implemented. Similarly, such a method may be applied to the following embodiments, and details are not repeated below.

Further, when the user performs voice communication using the mobile phone, the user may perform voice communication in a manner of holding mobile phone close to the head sometimes, or may perform voice communication using an accessory such as an earphone sometimes. When the mobile phone is close to the head, electromagnetic radiation of the mobile phone is required be as minimum as possible in order to reduce radiation to the head. In this embodiment of the present disclosure, it is further proposed to monitor whether an optical proximity sensor is triggered, to more accurately control the transmit power of the antenna.

It is easy to understand that, if the optical proximity sensor is triggered, it indicates that the mobile phone may be very close to the head. Otherwise, it indicates that the mobile phone may be relatively far away from the head.

Referring to Table 2, a status indicating whether the optical proximity sensor is triggered is added to a truth table preset in the mobile phone. Correspondingly, a transmit power of an antenna is different from that in Table 1.

TABLE 2

| State | | Transmit Power (dBm) | | |
|---|---|---|---|---|
| Sequence Number | Working State | Lower Antenna | Upper Antenna | WI-FI Antenna |
| 9 | Lower antenna in GSM voice + optical proximity sensor | 30.5 | NA | NA |
| 10 | Lower antenna in WCDMA voice + optical proximity sensor | 21.5 | NA | NA |
| 11 | Lower antenna in CDMA voice + optical proximity sensor | 21.5 | NA | NA |
| 12 | Lower antenna in LTE FDD&TDD voice + optical proximity sensor | 19 | NA | NA |
| 13 | Upper antenna in GSM voice + optical proximity sensor | NA | 28.5 | NA |
| 14 | Upper antenna in WCDMA voice + optical proximity sensor | NA | 20 | NA |
| 15 | Upper antenna in CDMA voice + optical proximity sensor | NA | 20 | NA |
| 16 | Upper antenna in LTE FDD&TDD voice + optical proximity sensor | NA | 18 | NA |

In Table 2, a working state in which the user holds the mobile phone close to the head (the optical proximity sensor is triggered) when the upper antenna 102 performs voice communication is used as an example. In this way, in this embodiment of the present disclosure, a condition of determining whether the optical proximity sensor is triggered is introduced such that the wireless communications terminal can control the transmit power of the antenna more accurately. Therefore, electromagnetic radiation is controlled without affecting communication quality.

Further, a SAR service application has been in a started state, and this consumes relatively much power of the mobile phone. Therefore, preferably, a trigger condition may be set for starting the SAR service application. For example, the mobile phone is set as a WI-FI access hotspot, or the mobile phone performs voice communication using an antenna in order to reduce power consumption.

Embodiment 2

Embodiment 2 provides another method for controlling a transmit power. For similar content, details are not repeated herein, and reference may be made to specific descriptions in Embodiment 1.

In this embodiment of the present disclosure, an example in which a first controller is an AP is used for description.

Figure 5:
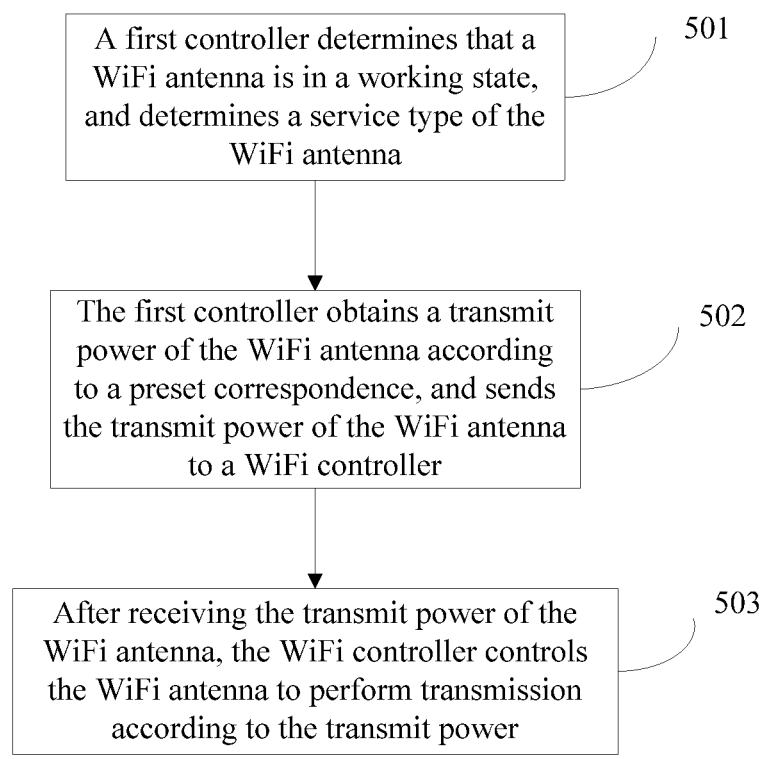
FIG. 5 is a flowchart of a method for controlling a transmit power of a wireless communications terminal according to Embodiment 2.

Referring to FIG. 5, it can be learnt that the method includes the following steps.

Step 501. The first controller determines that the WI-FI antenna is in a working state, and determines a service type of the WI-FI antenna.

Optionally, that the first controller determines a service type of the WI-FI antenna includes the following.

Determining, by the first controller, that the wireless communications terminal performs voice communication using the WI-FI, or determining, by the first controller, that the wireless communications terminal is set as a WI-FI access hotspot.

Further, referring to FIG. 2, after obtaining a working state of a WI-FI chipset, a WI-FI manager sends the working state of the WI-FI chipset to a monitor.

Step 502. The first controller obtains a transmit power of the WI-FI antenna according to a preset correspondence, and sends the transmit power of the WI-FI antenna to the WI-FI controller.

A truth table between the working state of the WI-FI antenna and the transmit power of the WI-FI antenna is preset in a mobile phone. The monitor obtains the transmit power of the WI-FI antenna according to the working state of the WI-FI antenna obtained by the monitor by means of monitoring, and sends the transmit power of the WI-FI antenna to an RILD. Then, the RILD sends the transmit power of the WI-FI antenna to the WI-FI controller.

A truth table in Table 3 shows a correspondence between the working state of the WI-FI antenna and the transmit power of the WI-FI antenna.

TABLE 3

| State | | Transmit Power (dBm) | | |
|---|---|---|---|---|
| Sequence Number | Working State | Lower Antenna | Upper Antenna | WI-FI Antenna |
| 17 | WI-FI access hot spot | NA | NA | 11 |
| 18 | WI-FI voice communication | NA | NA | 13 |

Step 503. After receiving the transmit power of the WI-FI antenna, the WI-FI controller controls the WI-FI antenna to perform transmission according to the transmit power.

It can be learnt from this embodiment of the present disclosure that, a service type of WI-FI is determined, and a transmit power of a WI-FI antenna is controlled according to a preset correspondence such that electromagnetic radiation can be accurately controlled without affecting communication quality.

Further, similarly, when the mobile phone performs voice communication using the WI-FI antenna, whether an optical proximity sensor is triggered may be further used in combination to determine whether the mobile phone is close to the head of a user in order to control the transmit power more accurately. Details are not repeated herein.

Embodiment 3

Embodiment 3 provides still another method for controlling a transmit power. For similar content, details are not repeated herein, and reference may be made to specific descriptions in Embodiment 1 and Embodiment 2.

Figure 6:
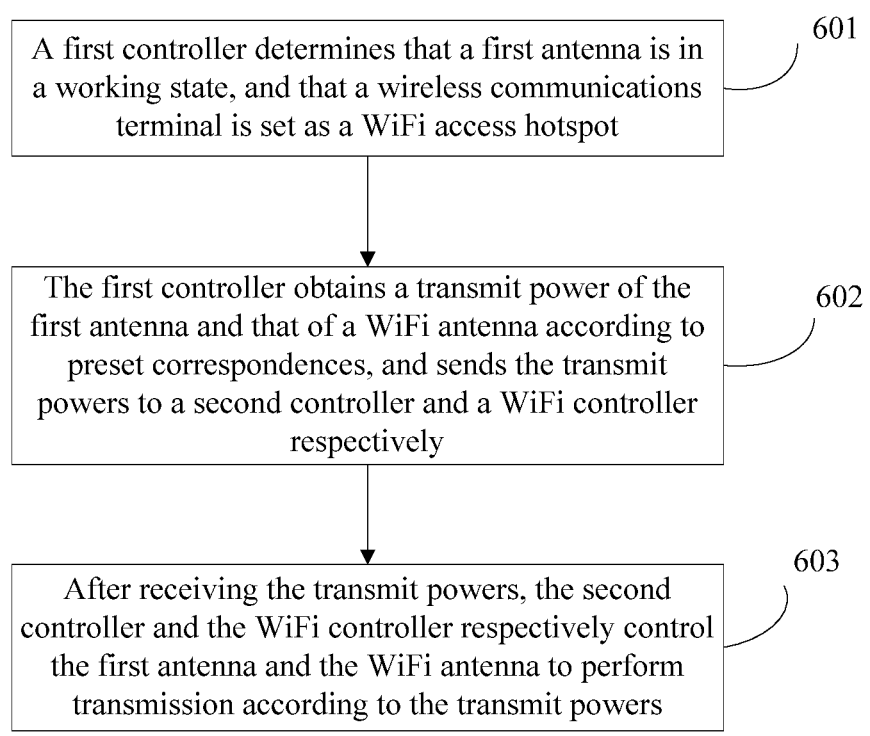
FIG. 6 is a flowchart of a method for controlling a transmit power of a wireless communications terminal according to Embodiment 3.

Referring to FIG. 6, the method includes the following steps.

Step 601. The first controller determines that the first antenna is in a working state, and the first controller determines that the wireless communications terminal is set as a WI-FI access hotspot.

In this embodiment of the present disclosure, antennas are combined. For example, a lower antenna 101 is in a working state, and a WI-FI chipset establishes a WI-FI network and serves as an access hotspot.

Step 602. The first controller obtains a transmit power of the first antenna and that of the WI-FI antenna according to preset correspondences, and sends the transmit powers to the second controller and a WI-FI controller respectively.

A truth table in Table 4 shows a correspondence between an antenna and a corresponding transmit power.

TABLE 4

| State | | Transmit Power (dBm) | | |
|---|---|---|---|---|
| Sequence Number | Working State | Lower Antenna | Upper Antenna | WI-FI Antenna |
| 19 | Lower antenna in GSM voice + WI-FI access hotspot | 30.5 | NA | 11 |
| 20 | Lower antenna in WCDMA voice + WI-FI access hotspot | 21.5 | NA | 11 |
| 21 | Lower antenna in CDMA voice + WI-FI access hotspot | 21.5 | NA | 11 |
| 22 | Lower antenna in LTE FDD&TDD voice + WI-FI access hotspot | 19 | NA | 11 |
| 23 | Upper antenna in GSM voice + WI-FI access hotspot | NA | 29 | 10 |
| 24 | Upper antenna in WCDMA voice + WI-FI access hotspot | NA | 20 | 10 |
| 25 | Upper antenna in CDMA voice + WI-FI access hotspot | NA | 20 | 10 |
| 26 | Upper antenna in LTE FDD&TDD voice + WI-FI access hotspot | NA | 19 | 10 |
| 27 | Lower antenna in GSM data + WI-FI access hotspot | 30.5 | NA | 11 |
| 28 | Lower antenna in WCDMA data + WI-FI access hotspot | 21.5 | NA | 11 |
| 29 | Lower antenna in CDMA data + WI-FI access hotspot | 21.5 | NA | 11 |
| 30 | Lower antenna in LTE FDD&TDD data + WI-FI access hotspot | 19 | NA | 11 |
| 31 | Upper antenna in GSM data + WI-FI access hotspot | NA | 29 | 10 |
| 32 | Upper antenna in WCDMA data + WI-FI access hotspot | NA | 20 | 10 |
| 33 | Upper antenna in CDMA data + WI-FI access hotspot | NA | 20 | 10 |
| 34 | Upper antenna in LTE FDD&TDD data + WI-FI access hotspot | NA | 19 | 10 |

Step 603. After receiving the transmit powers, the second controller and the WI-FI controller respectively control the first antenna and the WI-FI antenna to perform transmission according to the transmit powers.

According to this embodiment of the present disclosure, it may be determined that both the first antenna and the WI-FI antenna are in working states, and the transmit power of the first antenna and that of the WI-FI antenna are controlled according to the preset correspondences. Therefore, electromagnetic radiation can be accurately controlled without affecting communication quality.

Figure 7:
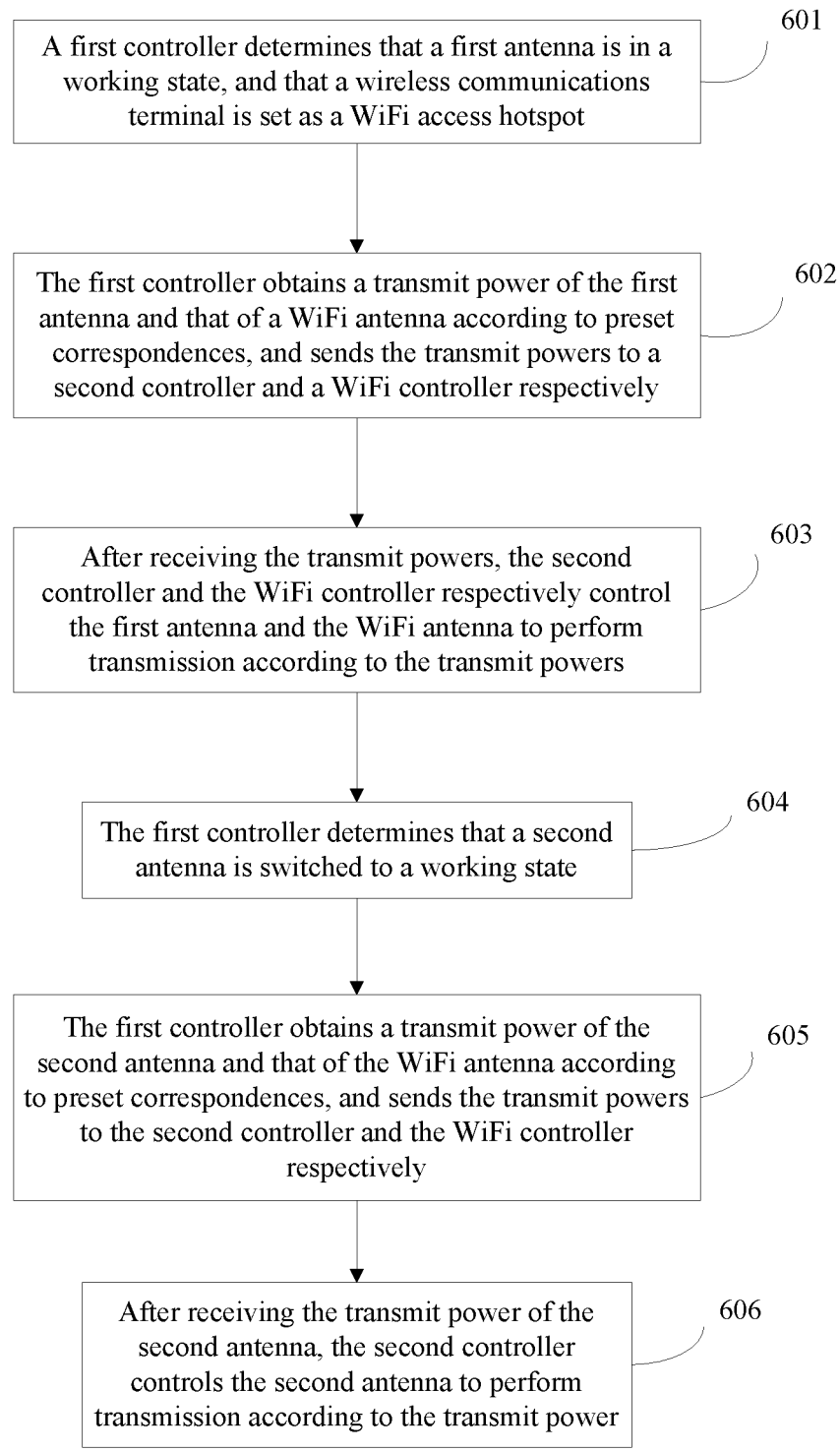
FIG. 7 is another flowchart of a method for controlling a transmit power of a wireless communications terminal according to Embodiment 3.

Further, during a period in which the WI-FI serves as an access hotspot, when a working state of the upper antenna or the lower antenna is switched, the first controller further obtains, according to the truth table, a transmit power of the antenna after the switching. Therefore, the transmit power can be accurately controlled. Details are not repeated herein. For details, refer to FIG. 7.

Further, because voice communication is involved, according to the foregoing embodiment, whether an optical proximity sensor is triggered may be further used in combination to determine whether a mobile phone is close to the head of a user in order to control a transmit power more accurately. Details are not repeated herein.

Embodiment 4

Embodiment 4 of the present disclosure provides an apparatus 800 for controlling a transmit power of a wireless communications terminal. The wireless communications terminal includes the apparatus, a controller, a first antenna, and a second antenna. The apparatus is configured to perform the method of Embodiment 1, and related descriptions are not repeated.

Figure 8:
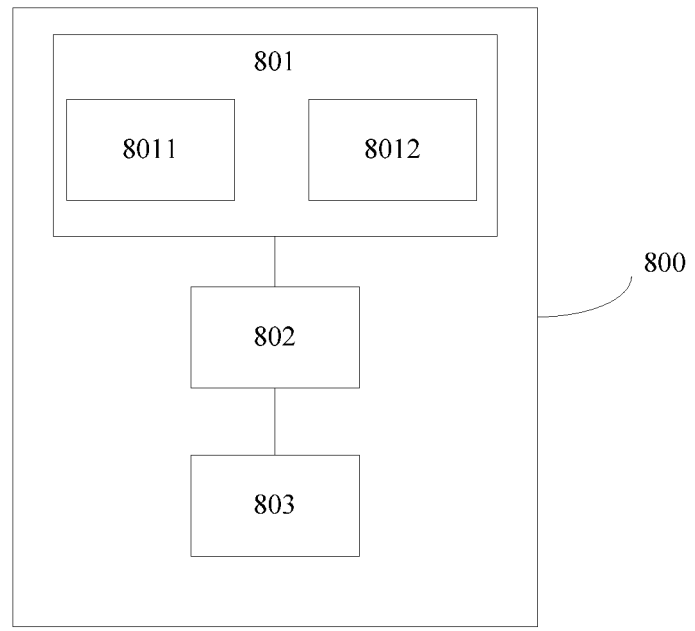
FIG. 8 is another schematic structural diagram of a wireless communications terminal according to an embodiment of the present disclosure.

Referring to FIG. 8, the apparatus 800 includes a determining module 801 configured to determine that the first antenna is in a working state, an obtaining module 802 configured to obtain a transmit power of the first antenna according to a preset correspondence, and a sending module 803 configured to send the obtained transmit power of the first antenna to the controller.

The transmit power of the first antenna obtained by the obtaining module 802 is used to control, after the controller receives the transmit power of the first antenna, the first antenna to perform transmission according to the transmit power.

Further, the determining module 801 is further configured to determine that the second antenna is switched to a working state.

The obtaining module 802 is further configured to obtain a transmit power of the second antenna according to a preset correspondence.

The sending module 803 is further configured to send the obtained transmit power of the second antenna to the controller.

The transmit power of the second antenna obtained by the obtaining module 802 is used to control, after the controller receives the transmit power of the second antenna, the second antenna to perform transmission according to the transmit power.

Optionally, the determining module 801 includes a first determining unit 8011.

The first determining unit 8011 is configured to determine that the wireless communications terminal performs voice communication using the first antenna, and determine a voice communication type of the first antenna.

The obtaining module 802 is further configured to obtain, based on the voice communication type of the first antenna, the transmit power of the first antenna according to a preset correspondence between the voice communication type of the first antenna and the transmit power of the first antenna.

Optionally, the first determining unit 8011 is further configured to determine that the wireless communications terminal switches from the first antenna to the second antenna to perform voice communication, and determine a voice communication type of the second antenna.

The obtaining module 802 is further configured to obtain, based on the voice communication type of the second antenna, the transmit power of the second antenna according to a preset correspondence between the voice communication type of the second antenna and the transmit power of the second antenna.

Optionally, the wireless communications terminal further includes an optical proximity sensor, and the determining module 801 includes a second determining unit 8012.

The second determining unit 8012 is configured to determine that the optical proximity sensor is triggered.

The obtaining module 802 is further configured to obtain the transmit power of the first antenna according to the preset correspondence. The correspondence is used to determine, based on the voice communication type of the first antenna and the case that the optical proximity sensor is triggered, the transmit power of the first antenna.

Optionally, the first determining unit 8011 is further configured to determine that the wireless communications terminal switches from the first antenna to the second antenna to perform voice communication, and determine a voice communication type of the second antenna.

The obtaining module 802 is further configured to obtain the transmit power of the second antenna according to the preset correspondence. The correspondence is used to determine, based on the voice communication type of the second antenna and the case that the optical proximity sensor is triggered, the transmit power of the second antenna.

Embodiment 5

Embodiment 5 of the present disclosure provides an apparatus 900 for controlling a transmit power of a wireless communications terminal. The wireless communications terminal includes the apparatus, a WI-FI controller, and a WI-FI antenna. The apparatus 800 is configured to perform the method of Embodiment 2, and related descriptions are not repeated.

Figure 9:
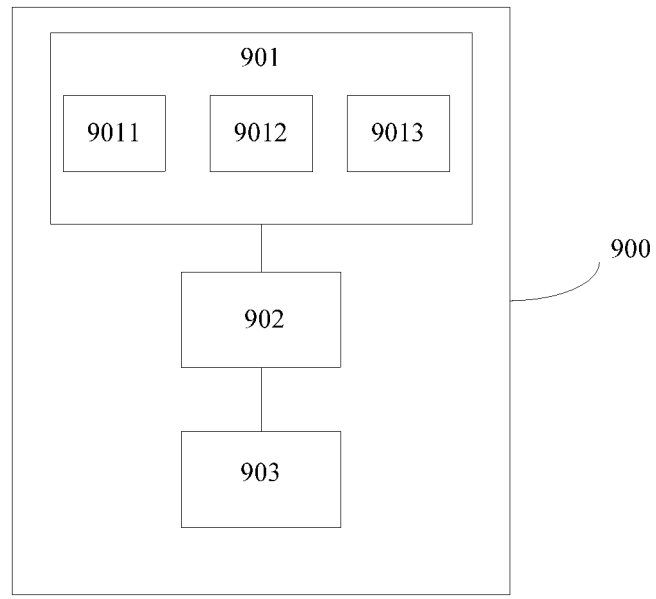
FIG. 9 is still another schematic structural diagram of a wireless communications terminal according to an embodiment of the present disclosure.

Referring to FIG. 9, the apparatus 900 includes a determining module 901 configured to determine that the WI-FI antenna is in a working state, and determine a service type of the WI-FI antenna, an obtaining module 902 configured to obtain a transmit power of the WI-FI antenna according to a preset correspondence, and a sending module 903 configured to send the obtained transmit power of the WI-FI antenna to the WI-FI controller.

The transmit power of the WI-FI antenna obtained by the obtaining module 902 is used to control, after the WI-FI controller receives the transmit power of the WI-FI controller, the WI-FI antenna to perform transmission according to the transmit power.

Optionally, the determining module 901 includes a first determining unit 9011.

The first determining unit 9011 is configured to determine that the wireless communications terminal performs voice communication using the WI-FI.

The obtaining module 902 is further configured to obtain the transmit power of the WI-FI antenna according to a preset correspondence between the WI-FI voice communication and the transmit power of the WI-FI antenna.

Optionally, the determining module 901 includes a second determining unit 9012.

The second determining unit 9012 is configured to determine that the wireless communications terminal is set as a WI-FI access hotspot.

The obtaining module 902 is further configured to obtain the transmit power of the WI-FI antenna according to a preset correspondence between the WI-FI access hotspot and the transmit power of the WI-FI antenna.

Optionally, the wireless communications terminal further includes an optical proximity sensor, and the determining module 901 further includes a third determining unit 9013.

The third determining unit 9013 is configured to determine that the optical proximity sensor is triggered.

The obtaining module 902 is further configured to obtain the transmit power of the WI-FI antenna according to the preset correspondence. The correspondence is used to determine, based on the case that the WI-FI performs voice communication and the case that the optical proximity sensor is triggered, the transmit power of the WI-FI antenna.

Embodiment 6

Embodiment 6 of the present disclosure provides an apparatus 1000 for controlling a transmit power of a wireless communications terminal. The wireless communications terminal includes the apparatus, a controller, a WI-FI controller, a first antenna, a second antenna, and a WI-FI antenna. The apparatus 1000 is configured to perform the method of Embodiment 3, and related descriptions are not repeated.

Figure 10:
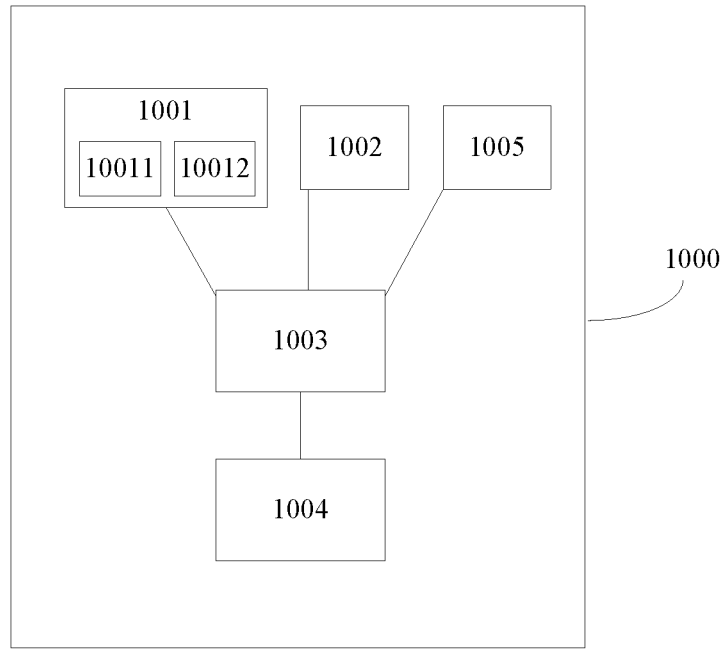
FIG. 10 is yet another schematic structural diagram of a wireless communications terminal according to an embodiment of the present disclosure.

Referring to FIG. 10, the apparatus 1000 includes a first determining module 1001 configured to determine that the first antenna is in a working state, a second determining module 1002 configured to determine that the wireless communications terminal is set as a WI-FI access hotspot, an obtaining module 1003 configured to obtain a transmit power of the first antenna and that of the WI-FI antenna according to preset correspondences, and a sending module 1004 configured to send the obtained transmit power of the first antenna and that of the WI-FI antenna to the controller and the WI-FI controller respectively.

The transmit power of the first antenna and that of the WI-FI antenna obtained by the obtaining module 1003 are used to respectively control, after the controller and the WI-FI controller receive the transmit powers, the first antenna and the WI-FI antenna to perform transmission according to the transmit powers.

Optionally, the first determining module 1001 is further configured to determine that the second antenna is switched to a working state.

The obtaining module 1003 is further configured to obtain a transmit power of the second antenna and that of the WI-FI antenna according to preset correspondences, and send the transmit powers to the second controller and the WI-FI controller respectively.

The transmit power of the second antenna and that of the WI-FI antenna obtained by the obtaining module 1003 are used to respectively control, after the controller and the WI-FI controller receive the transmit powers, the second antenna and the WI-FI antenna to perform transmission according to the transmit powers.

Optionally, the first determining module 1001 includes a first determining unit 10011.

The first determining unit 10011 is configured to determine that the wireless communications terminal performs voice communication using the first antenna, and determine a voice communication type of the first antenna.

The obtaining module 1003 is further configured to determine the transmit power of the first antenna and that of the WI-FI antenna according to preset first and second correspondences. The first correspondence is used to determine, based on the voice communication type of the first antenna and the case that the wireless communications terminal is set as a WI-FI access hotspot, the transmit power of the first antenna. The second correspondence is used to determine, based on the voice communication type of the first antenna and the case that the wireless communications terminal is set as a WI-FI access hotspot, the transmit power of the WI-FI antenna.

Optionally, the first determining unit 10011 is further configured to determine that the wireless communications terminal switches from the first antenna to the second antenna to perform voice communication, and determine a voice communication type of the second antenna.

The obtaining module 1003 is further configured to determine the transmit power of the second antenna and that of the WI-FI antenna according to preset third and fourth correspondences. The third correspondence is used to determine, based on the voice communication type of the second antenna and the case that the wireless communications terminal is set as a WI-FI access hotspot, the transmit power of the second antenna. The fourth correspondence is used to determine, based on the voice communication type of the second antenna and the case that the wireless communications terminal is set as a WI-FI access hotspot, the transmit power of the WI-FI antenna.

Optionally, the first determining module 1001 includes a second determining unit 10012.

The second determining unit 10012 is configured to determine that the wireless communications terminal performs data transmission using the first antenna.

The obtaining module 1003 is further configured to determine the transmit power of the first antenna and that of the WI-FI antenna according to preset fifth and sixth correspondences. The fifth correspondence is used to determine, based on the case that the first antenna performs data transmission and the case that the terminal is set as a WI-FI access hotspot, the transmit power of the first antenna. The sixth correspondence is used to determine, based on the case that the first antenna performs data transmission and the case that the terminal is set as a WI-FI access hotspot, the transmit power of the WI-FI antenna.

Optionally, the second determining unit 10012 is further configured to determine that the wireless communications terminal switches from the first antenna to the second antenna, to perform data transmission.

The obtaining module 1003 is further configured to determine the transmit power of the second antenna and that of the WI-FI antenna according to preset seventh and eighth correspondences. The seventh correspondence is used to determine, based on the case that the second antenna performs data transmission and the case that the wireless communications terminal is set as a WI-FI access hotspot, the transmit power of the second antenna. The eighth correspondence is used to determine, based on the case that the second antenna performs data transmission and the case that the wireless communications terminal is set as a WI-FI access hotspot, the transmit power of the WI-FI antenna.

Optionally, the wireless communications terminal further includes an optical proximity sensor, and the apparatus 1000 further includes a third determining module 1005.

The third determining module 1005 is configured to determine that the optical proximity sensor is triggered.

The obtaining module 1003 is further configured to determine the transmit power of the first antenna and that of the WI-FI antenna according to preset ninth and tenth correspondences. The ninth correspondence is used to determine, based on the voice communication type of the first antenna, the case that the wireless communications terminal is set as a WI-FI access hotspot, and the case that the optical proximity sensor is triggered, the transmit power of the first antenna. The second correspondence is used to determine, based on the voice communication type of the first antenna, the case that the wireless communications terminal is set as a WI-FI access hotspot, and the case that the optical proximity sensor is triggered, the transmit power of the WI-FI antenna.

Optionally, the first determining unit 1001 is further configured to determine that the wireless communications terminal switches from the first antenna to the second antenna to perform voice communication, and determine a voice communication type of the second antenna.

The obtaining module 1003 is further configured to determine the transmit power of the second antenna and that of the WI-FI antenna according to preset eleventh and twelfth correspondences. The eleventh correspondence is used to determine, based on the voice communication type of the second antenna, the case that the wireless communications terminal is set as a WI-FI access hotspot, and the case that the optical proximity sensor is triggered, the transmit power of the second antenna. The twelfth correspondence is used to determine, based on the voice communication type of the second antenna, the case that the wireless communications terminal is set as a WI-FI access hotspot, and the case that the optical proximity sensor is triggered, the transmit power of the WI-FI antenna.

Embodiments 7 to 9 each provide a method for controlling a transmit power of a wireless communications terminal, and are respectively corresponding to Embodiments 1 to 3. A difference lies in that, in Embodiments 1 to 3, the wireless communications terminal includes a first controller and a second controller, for example, an AP and a communication processor, and the two execute respective functions in a relatively independent way. It is easy to understand that, the wireless communications terminal may have only one controller. The controller may integrate functions independently executed by the AP and the communication processor, and the controller executes all the functions.

Embodiment 7

This embodiment of the present disclosure provides a method for controlling a transmit power of a wireless communications terminal. The wireless communications terminal includes a controller, a first antenna, and a second antenna. For similar content, refer to Embodiment 1. Details are not repeated herein.

Figure 11:
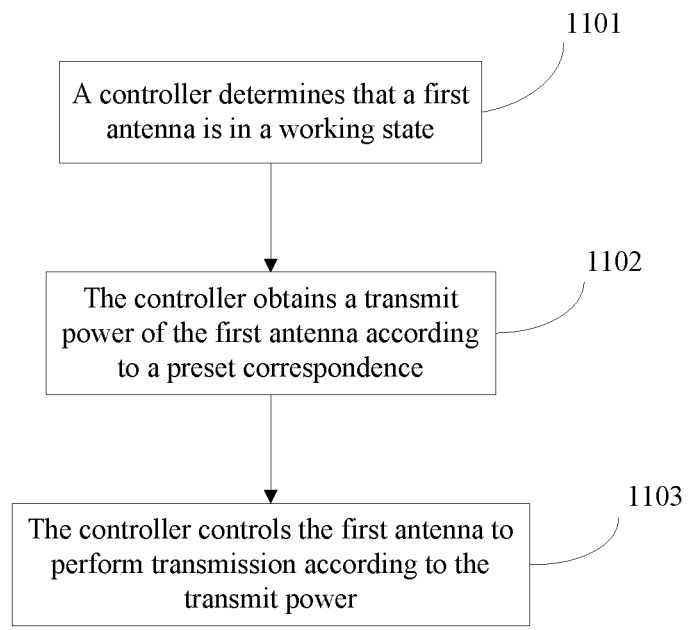
FIG. 11 is a flowchart of a method for controlling a transmit power of a wireless communications terminal according to Embodiment 7.

Referring to FIG. 11, the method includes the following steps.

Step 1101. The controller determines that the first antenna is in a working state.

Step 1102. The controller obtains a transmit power of the first antenna according to a preset correspondence.

Step 1103. The controller controls the first antenna to perform transmission according to the transmit power.

Figure 12:
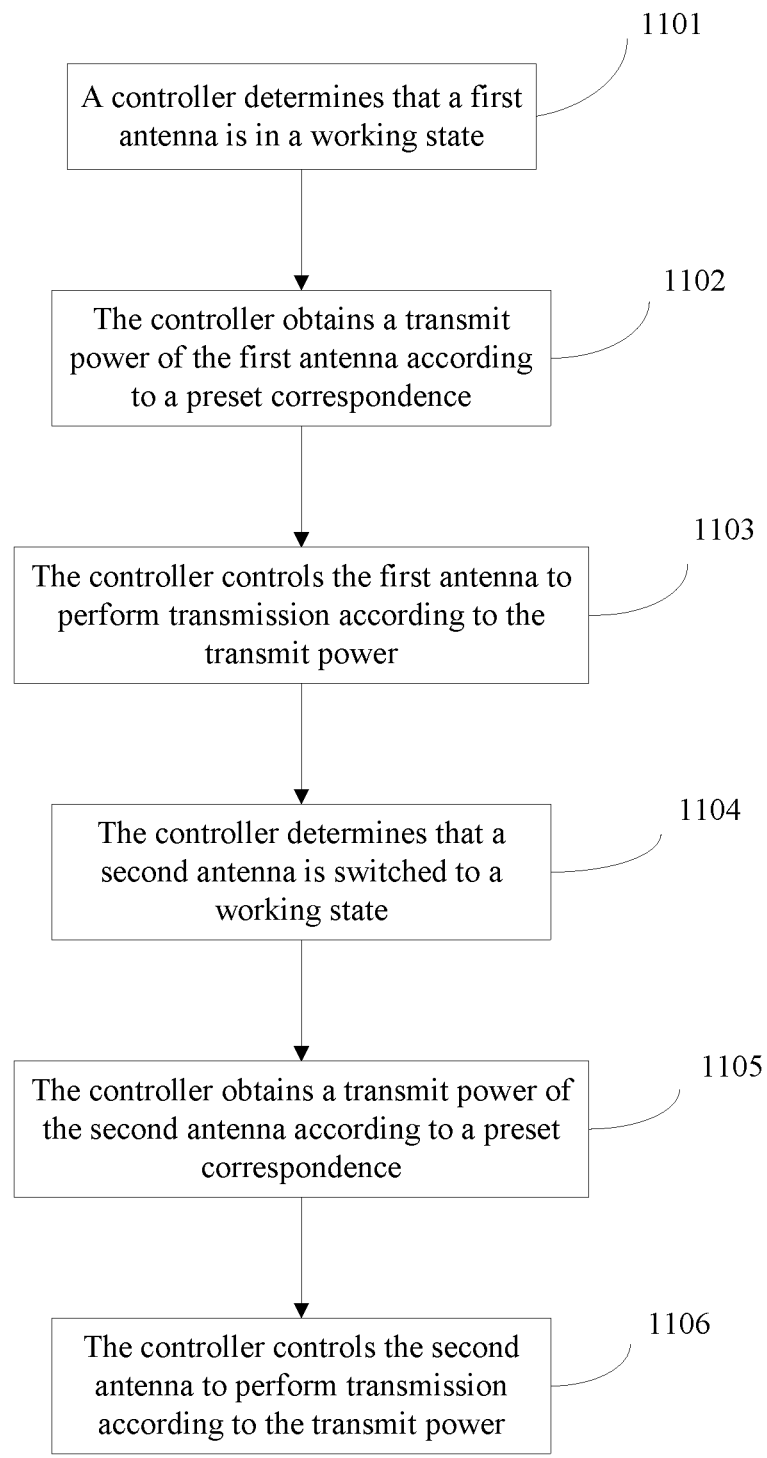
FIG. 12 is another flowchart of a method for controlling a transmit power of a wireless communications terminal according to Embodiment 7.

Referring to FIG. 12, the following steps may be added to the method in FIG. 11.

Step 1104. The controller determines that the second antenna is switched to a working state.

Step 1105. The controller obtains a transmit power of the second antenna according to a preset correspondence.

Step 1106. The controller controls the second antenna to perform transmission according to the transmit power.

Similarly, that the controller determines the working state of the first or the second antenna includes determining, by the controller, that the wireless communications terminal performs voice communication using the first or the second antenna, and determining, by the controller, a voice communication type of the first or the second antenna.

Similarly, whether an optical proximity sensor is triggered may be further used in combination, to control the transmit power of the first or the second antenna more accurately.

Embodiment 8

This embodiment of the present disclosure provides a method for controlling a transmit power of a wireless communications terminal. The wireless communications terminal includes a controller, a WI-FI controller, and a WI-FI antenna. For similar content, refer to Embodiment 1 and Embodiment 2. Details are not repeated herein.

Figure 13:
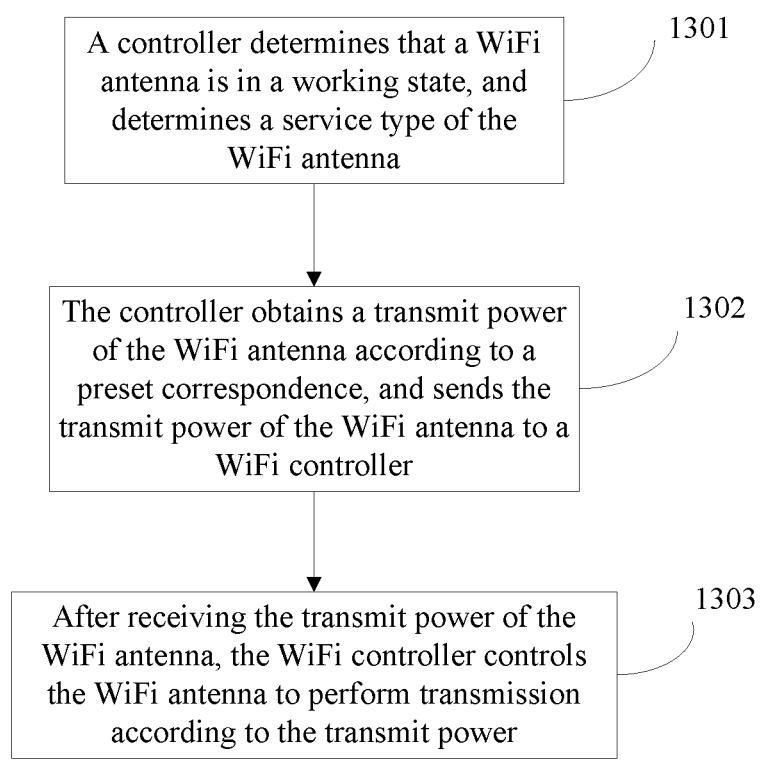
FIG. 13 is a flowchart of a method for controlling a transmit power of a wireless communications terminal according to Embodiment 8.

Referring to FIG. 13, the method includes the following steps.

Step 1301. The controller determines that the WI-FI antenna is in a working state, and determines a service type of the WI-FI antenna.

Step 1302. The controller obtains a transmit power of the WI-FI antenna according to a preset correspondence, and sends the transmit power of the WI-FI antenna to the WI-FI controller.

Step 1303. After receiving the transmit power of the WI-FI antenna, the WI-FI controller controls the WI-FI antenna to perform transmission according to the transmit power.

Similarly, that the controller determines a service type of the WI-FI antenna includes determining, by the controller, that the wireless communications terminal performs voice communication using the WI-FI, or determining, by the controller, that the wireless communications terminal is set as a WI-FI access hotspot.

Similarly, whether an optical proximity sensor is triggered may be further used in combination, to control the transmit power of the WI-FI antenna more accurately.

Embodiment 9

This embodiment of the present disclosure provides a method for controlling a transmit power of a wireless communications terminal. The wireless communications terminal includes a controller, a WI-FI controller, a first antenna, a second antenna, and a WI-FI antenna. For similar content, refer to Embodiment 1, Embodiment 2, and Embodiment 3. Details are not repeated herein.

Figure 14:
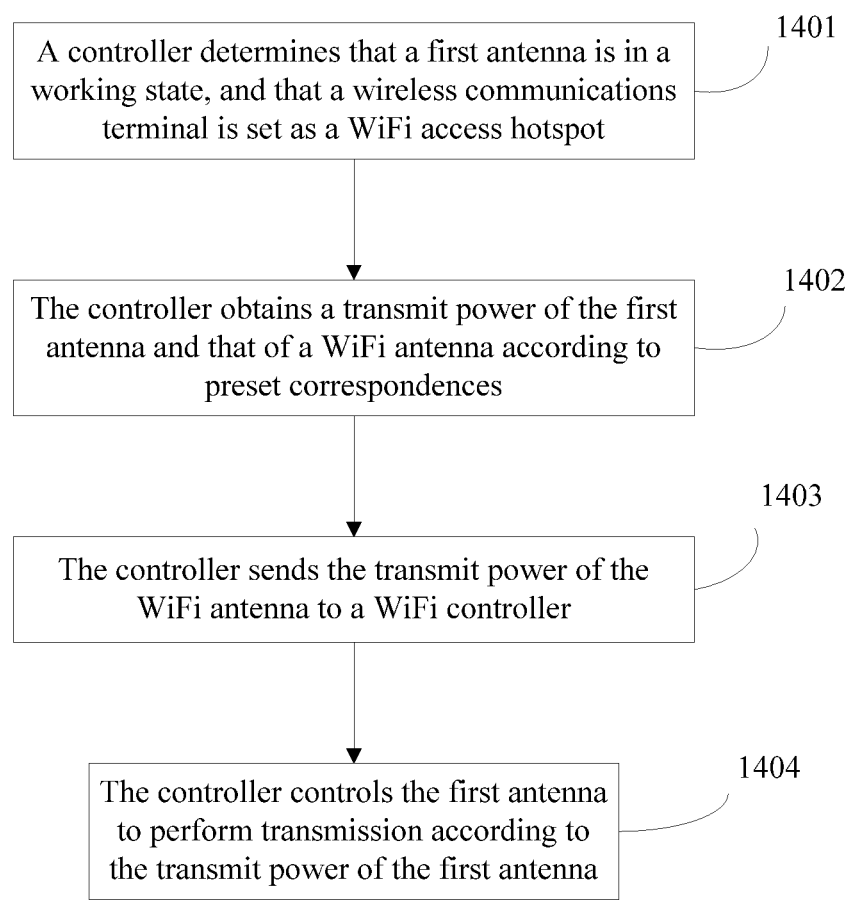
FIG. 14 is a flowchart of a method for controlling a transmit power of a wireless communications terminal according to Embodiment 9.

Referring to FIG. 14, the method includes the following steps.

Step 1401. The controller determines that the first antenna is in a working state, and the controller determines that the wireless communications terminal is set as a WI-FI access hotspot.

Step 1402. The controller obtains a transmit power of the first antenna and that of the WI-FI antenna according to preset correspondences.

Step 1403. The controller sends the transmit power of the WI-FI antenna to the WI-FI controller, where the transmit power of the WI-FI antenna is used to control, after the WI-FI controller receives the transmit power of the WI-FI antenna, the WI-FI antenna to perform transmission according to the transmit power of the WI-FI antenna.

Step 1404. The controller controls the first antenna to perform transmission according to the transmit power of the first antenna.

Figure 15:
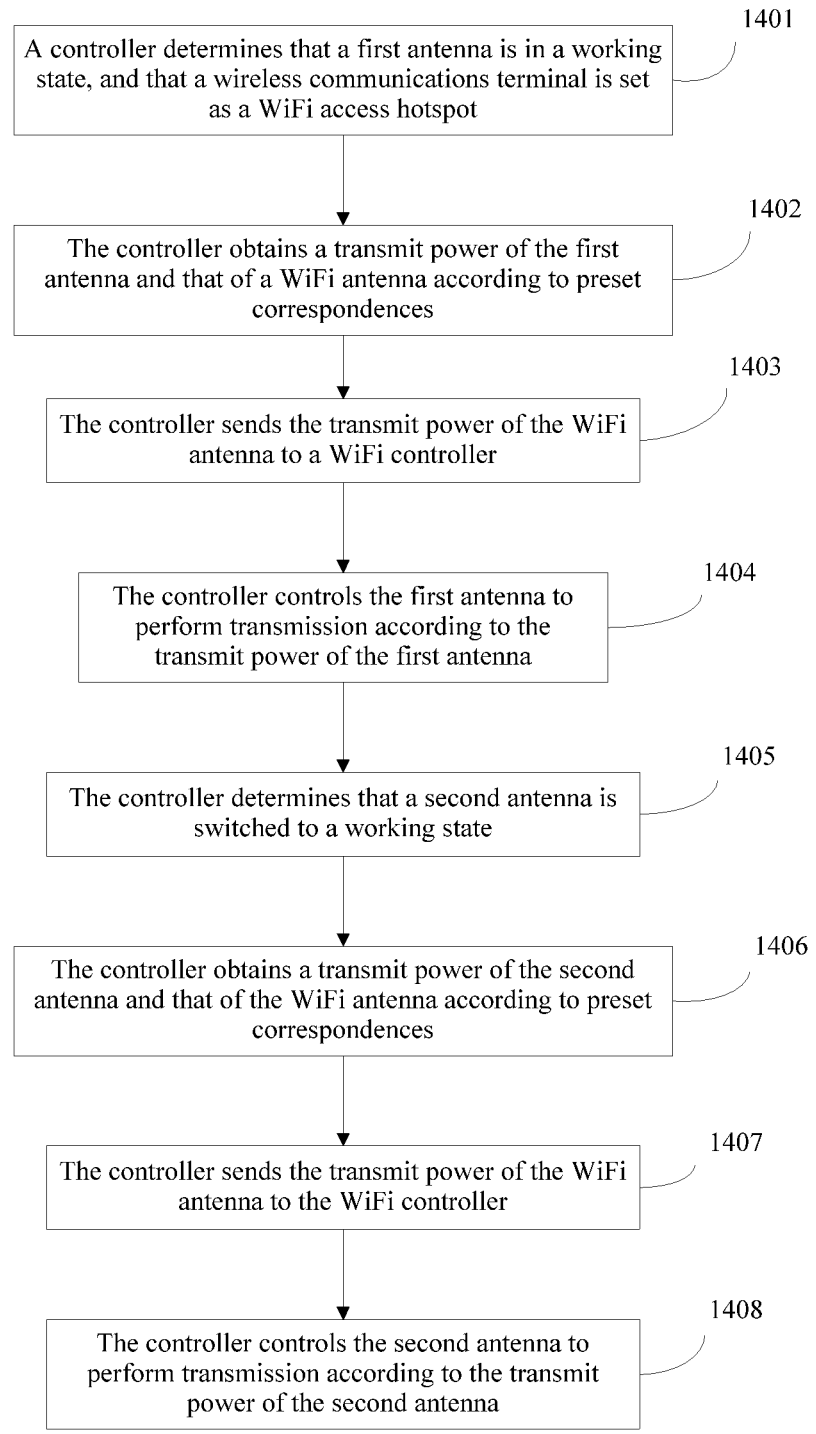
FIG. 15 is another flowchart of a method for controlling a transmit power of a wireless communications terminal according to Embodiment 9.

Referring to FIG. 15, the following steps may be added to the method in FIG. 13

Step 1405. The controller determines that the second antenna is switched to a working state.

Step 1406. The controller obtains a transmit power of the second antenna and that of the WI-FI antenna according to preset correspondences.

Step 1407. The controller sends the transmit power of the WI-FI antenna to the WI-FI controller, where the transmit power of the WI-FI antenna is used to control, after the WI-FI controller receives the transmit power of the WI-FI antenna, the WI-FI antenna to perform transmission according to the transmit power of the WI-FI antenna.

Step 1408. The controller controls the second antenna to perform transmission according to the transmit power of the second antenna.

Similarly, in the method, a transmit power of an antenna may be determined according to a voice communication type of the first antenna or the second antenna or a case that the first antenna or the second antenna is in a data transmission and in combination with a case that the wireless communications terminal is set as a WI-FI access hotspot.

Similarly, whether an optical proximity sensor is triggered may be further used in combination, to control the transmit power of the WI-FI antenna more accurately.

Embodiments 10 To 12

Embodiments 10 to 12 provide a wireless communications terminal respectively, and the wireless communications terminal is configured to perform the methods in Embodiments 7 to 9 respectively.

Further, Embodiment 10 provides a wireless communications terminal, including a controller, a first antenna, and a second antenna. The controller is configured to perform the method described in Embodiment 7. For related descriptions, refer to Embodiment 7 and Embodiment 1. Details are not repeated herein.

Embodiment 11 provides a wireless communications terminal, including a controller, a WI-FI controller, and a WI-FI antenna. The controller is configured to perform the method described in Embodiment 8. For related descriptions, refer to Embodiment 8, Embodiment 1, and Embodiment 2. Details are not repeated herein.

Embodiment 12 provides a wireless communications terminal, including a controller, a WI-FI controller, a first antenna, a second antenna, and a WI-FI antenna. The controller is configured to perform the method described in Embodiment 9. For related descriptions, further refer to Embodiment 9 and Embodiments 1 to 3. Details are not repeated herein.

Further, a person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The storage medium may include a magnetic disk, an optical disc, a read-only memory (ROM), or a RAM.

In short, the foregoing descriptions are merely examples of embodiments of the present disclosure, but are not intended to limit the protection scope of the present disclosure. Any modification, equivalent replacement, or improvement made without departing from the spirit and principle of the present disclosure shall fall within the protection scope of the present disclosure.

What is claimed is:

1. A method for controlling a transmit power of a wireless communications terminal that comprises a first controller, a second controller, a first antenna, and a second antenna, wherein the method comprises:
    determining, by the first controller, that the first antenna is in a working state;
    obtaining, by the first controller, a first transmit power of the first antenna according to a first preset correspondence between the working state and the first transmit power;
    sending, by the first controller, the first transmit power to the second controller; and
    controlling, by the second controller, the first antenna to perform transmission according to the first transmit power.

2. The method of claim 1, further comprising:
    determining, by the first controller, that the second antenna is switched to a working state;
    obtaining, by the first controller, a second transmit power of the second antenna according to a second preset correspondence;
    sending, by the first controller, the second transmit power to the second controller; and
    controlling, by the second controller, the second antenna to perform transmission according to the second transmit power.

3. The method of claim 2, wherein the first controller determines that the second antenna is switched to the working state by:
    determining, by the first controller, that the wireless communications terminal switches from the first antenna to the second antenna to perform voice communication; and
    determining, by the first controller, a voice communication type of the second antenna,
    wherein the first controller obtains the second transmit power of the second antenna according to the second preset correspondence by obtaining, based on the voice communication type of the second antenna by the first controller, the second transmit power according to a preset correspondence between the voice communication type of the second antenna and the second transmit power.

4. The method of claim 3, wherein the voice communication type of the second antenna comprises a first voice communication type and a second voice communication type, and wherein the second voice communication type has a higher communications level than the first voice communication type.

5. The method of claim 2, wherein the first controller determines that the second antenna is switched to the working state by:
    determining, by the first controller, that the wireless communications terminal switches from the first antenna to the second antenna to perform voice communication; and determining, by the first controller, a voice communication type of the second antenna,
wherein the wireless communications terminal further comprises an optical proximity sensor,
wherein the method further comprises determining, by the first controller, that the optical proximity sensor is triggered, and
wherein the second correspondence is used to determine, based on the voice communication type of the second antenna and in a case that the optical proximity sensor is triggered, the second transmit power.

6. The method of claim 1, wherein the first controller determines that the first antenna is in the working state by:
determining, by the first controller, that the wireless communications terminal performs voice communication using the first antenna; and
determining, by the first controller, a voice communication type of the first antenna,
wherein the first controller obtains the first transmit power of the first antenna according to the first preset correspondence by obtaining, based on the voice communication type of the first antenna by the first controller, the first transmit power of the first antenna according to a preset correspondence between the voice communication type of the first antenna and the transmit power of the first antenna.

7. The method of claim 6, wherein the voice communication type of the first antenna comprises a first voice communication type and a second voice communication type, and wherein the second voice communication type has a higher communications level than the first voice communication type.

8. The method of claim 6, wherein the first controller is configured to:
receive the voice communication type of the first or the second antenna reported by the second controller; and
determine the voice communication type of the first or the second antenna.

9. The method of claim 1, wherein the first controller determines that the first antenna is in the working state by:
determining, by the first controller, that the wireless communications terminal performs voice communication using the first antenna; and
determining, by the first controller, a voice communication type of the first antenna,
wherein the wireless communications terminal further comprises an optical proximity sensor,
wherein the method further comprises determining, by the first controller, that the optical proximity sensor is triggered, and
wherein the first correspondence is used to determine, based on the voice communication type of the first antenna and in a case that the optical proximity sensor is triggered, the first transmit power of the first antenna.

10. The method of claim 1, wherein the first transmit power of the first antenna is less than a corresponding standard transmit power of the first antenna, or wherein the second transmit power of the second antenna is less than a corresponding standard transmit power of the second antenna.

11. A wireless communications terminal, comprising:
a first controller;
a second controller;
a first antenna coupled to the first controller and the second controller; and
a second antenna coupled to the first controller,
wherein the first controller is configured to:

determine that the first antenna is in a working state;
obtain a first transmit power of the first antenna according to a first preset correspondence between the working state and the first transmit power; and
send the first transmit power to the second controller, and
wherein the second controller is configured to control the first antenna to perform transmission according to the first transmit power.

12. The wireless communications terminal of claim 11, wherein the first controller is further configured to:
determine that the second antenna is switched to a working state;
obtain a second transmit power of the second antenna according to a second preset correspondence; and
send the second transmit power to the second controller, and
wherein the second controller is further configured to control the second antenna to perform transmission according to the second transmit power.

13. The wireless communications terminal of claim 12, wherein the first controller determines that the second antenna is switched to the working state by:
determining that the wireless communications terminal switches from the first antenna to the second antenna to perform voice communication; and
determining a voice communication type of the second antenna, and
wherein the first controller obtains the second transmit power of the second antenna according to the second preset correspondence by obtaining, based on the voice communication type of the second antenna, the second transmit power of the second antenna according to a preset correspondence between the voice communication type of the second antenna and the second transmit power.

14. The wireless communications terminal of claim 13, wherein the voice communication type of the second antenna comprises a first voice communication type and a second voice communication type, and wherein the second voice communication type has a higher communications level than the first voice communication type.

15. The wireless communications terminal of claim 12, further comprising an optical proximity sensor coupled to the first controller, wherein the first controller determines that the second antenna is switched to the working state by:
determining that the wireless communications terminal switches from the first antenna to the second antenna to perform voice communication; and
determining a voice communication type of the second antenna, and
wherein the second preset correspondence is used to determine, based on the voice communication type of the second antenna and in a case that the optical proximity sensor is triggered, the second transmit power.

16. The wireless communications terminal of claim 11, wherein the first controller determines that the first antenna is in a working state by:
determining that the wireless communications terminal performs voice communication using the first antenna; and
determining a voice communication type of the first antenna, and
wherein the first controller obtains the first transmit power of the first antenna according to the first preset correspondence by obtaining, based on the voice communication type of the first antenna, the first transmit power of the first antenna according to a preset correspondence between the voice communication type of the first antenna and the first transmit power.

17. The wireless communications terminal of claim 16, wherein the voice communication type of the first antenna comprises a first voice communication type and a second voice communication type, and wherein the second voice communication type has a higher communications level than the first voice communication type.

18. The wireless communications terminal of claim 11, further comprising an optical proximity sensor coupled to the first controller, wherein the first controller determines that the first antenna is in the working state by:
   determining that the wireless communications terminal performs voice communication using the first antenna; and
   determining a voice communication type of the first antenna, and
   wherein the first controller obtains the first transmit power of the first antenna according to the first preset correspondence by:
   determining that the optical proximity sensor is triggered; and
   obtaining the first transmit power of the first antenna according to the first preset correspondence, wherein the first correspondence is used to determine, based on the voice communication type of the first antenna and in a case that the optical proximity sensor is triggered, the first transmit power.

19. The wireless communications terminal of claim 11, wherein the first transmit power of the first antenna is less than a corresponding standard transmit power of the first antenna.

20. The wireless communications terminal of claim 11, wherein the transmit power of the second antenna is less than a corresponding standard transmit power of the second antenna.

* * * * *